US011733838B2

(12) United States Patent
Agarwal et al.

(10) Patent No.: US 11,733,838 B2
(45) Date of Patent: Aug. 22, 2023

(54) AUGMENTED REALITY ENABLED AUTONOMOUS VEHICLE COMMAND CENTER

(71) Applicant: Motional AD LLC, Boston, MA (US)

(72) Inventors: Shaurya Agarwal, Boston, MA (US); Ayman Alalao, Cambridge, MA (US); Tyler Hendrickson, Tewksbury, MA (US)

(73) Assignee: Motional AD LLC, Boston, MA (US)

( * ) Notice: Subject to any disclaimer, the term of this patent is extended or adjusted under 35 U.S.C. 154(b) by 70 days.

(21) Appl. No.: 17/092,188

(22) Filed: Nov. 6, 2020

(65) Prior Publication Data
US 2022/0147203 A1 May 12, 2022

(51) Int. Cl.
*G06F 3/0484* (2022.01)
*G05D 1/02* (2020.01)
*G06F 3/01* (2006.01)
*G05D 1/00* (2006.01)
*G06T 11/00* (2006.01)

(52) U.S. Cl.
CPC ......... *G06F 3/0484* (2013.01); *G05D 1/0038* (2013.01); *G05D 1/0282* (2013.01); *G06F 3/017* (2013.01); *G06T 11/00* (2013.01); *G05D 2201/0213* (2013.01); *G06T 2200/24* (2013.01)

(58) Field of Classification Search
CPC ..... G06F 3/0484; G06F 3/017; G05D 1/0038; G05D 1/0282; G05D 2201/0213; G06T 11/00; G06T 2200/24
See application file for complete search history.

(56) References Cited

U.S. PATENT DOCUMENTS

| 10,410,182 | B1* | 9/2019 | Tang | G07C 5/085 |
| 2012/0206334 | A1* | 8/2012 | Osterhout | G06F 1/163 |
| | | | | 345/156 |
| 2013/0238167 | A1* | 9/2013 | Stanfield | E05B 81/56 |
| | | | | 701/2 |

(Continued)

FOREIGN PATENT DOCUMENTS

EP    3605488    2/2020

OTHER PUBLICATIONS

[No Author Listed], "SAE: J3016: Taxonomy and Definitions for Terms Related to On-Road Motor Vehicle Automated Driving Systems," J3016, Sep. 30, 2016, 30 pages.

(Continued)

*Primary Examiner* — Daniel W Parcher
(74) *Attorney, Agent, or Firm* — Fish & Richardson P.C.

(57) ABSTRACT

Among other things, techniques are described for monitoring and controlling autonomous vehicles (AVs). As an example, at least one processor determines that a first AV is in a field of view of a user wearing an augmented reality display device, determines first data regarding an operation of the first AV, and causes at least a portion of the first data to be presented to the user using the augmented reality display device. For example, a graphical user interface is presented in the field of view of the user using the augmented reality display device, and at least the portion of the first data is included on the graphical user interface, such that at least the portion of the first data appears to be arranged spatially proximal to the first AV in the field of view of the user.

18 Claims, 28 Drawing Sheets

(56) References Cited

U.S. PATENT DOCUMENTS

| | | | | |
|---|---|---|---|---|
| 2014/0277933 A1* | 9/2014 | Grossman | ............... | B60K 35/00 |
| | | | | 701/36 |
| 2014/0354684 A1* | 12/2014 | Beckwith | ................ | G06F 3/011 |
| | | | | 345/633 |
| 2014/0358411 A1* | 12/2014 | Khoe | ................. | G01C 21/3661 |
| | | | | 701/117 |
| 2016/0026253 A1* | 1/2016 | Bradski | ................ | H04N 13/128 |
| | | | | 345/8 |
| 2016/0061613 A1* | 3/2016 | Jung | ................. | G01C 21/3632 |
| | | | | 701/538 |
| 2016/0328883 A1* | 11/2016 | Parfenov | ................. | G06T 17/00 |
| 2018/0322775 A1* | 11/2018 | Chase | .................... | G08G 1/012 |
| 2019/0206258 A1 | 7/2019 | Chang et al. | | |
| 2021/0097866 A1* | 4/2021 | Leary | ................... | G05D 1/0248 |

OTHER PUBLICATIONS

Piumsomboon et al., "User-Defined Gestures for Augmented Reality," CHI'13, Paris, France, Apr. 27-May 2, 2013; IFIP Conference on Human-Computer Interaction, Sep. 2013, pp. 282-299.

\* cited by examiner

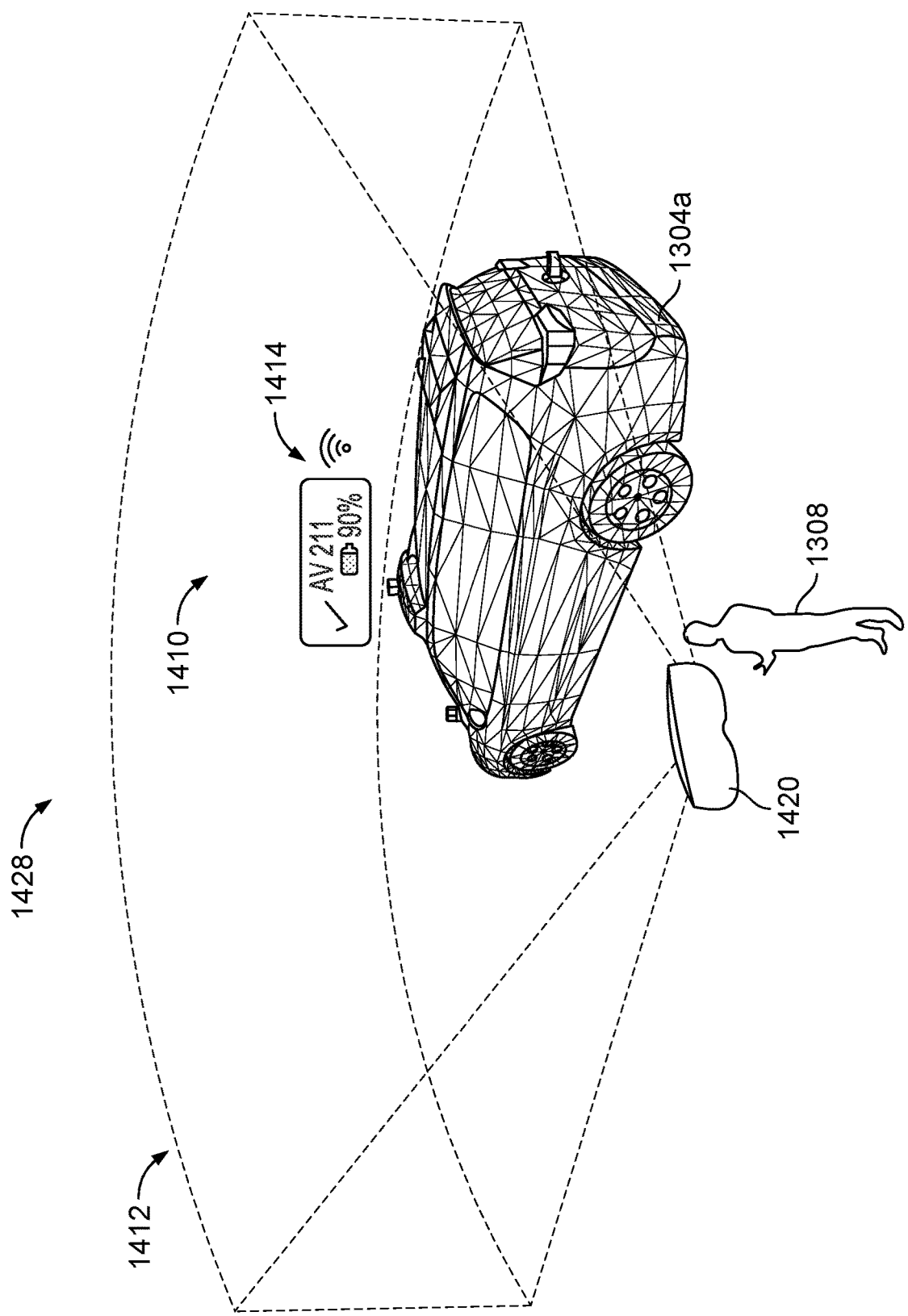

AUGMENTED REALITY ENABLED AUTONOMOUS VEHICLE COMMAND CENTER

FIELD OF THE INVENTION

This description relates to a computer system for remotely monitoring and controlling the operation of autonomous vehicles.

BACKGROUND

Autonomous vehicles (AVs) can be used to transport people and/or cargo (e.g., packages, objects, or other items) from one location to another. As an example, an AV can navigate to the location of a person, wait for the person to board the AV, and traverse to a specified destination (e.g., a location selected by the person). As another example, an AV can navigate to the location of cargo, wait for the cargo to be loaded into the AV, and navigate to a specified destination (e.g., a delivery location for the cargo).

In some implementations, an operation of an AV can be remotely monitored and/or controlled. For example, a command center can be implemented using one or more computer systems that are remote from the AV. The command center can receive information from the AV (e.g., data describing the operation of the AV), and transmit information to the AV (e.g., commands instructing the AV to perform certain tasks).

BRIEF DESCRIPTION OF THE DRAWINGS

FIG. 14C shows an example graphical user interface GUI that can be presented by an augmented reality system.

DETAILED DESCRIPTION

Figure 1:
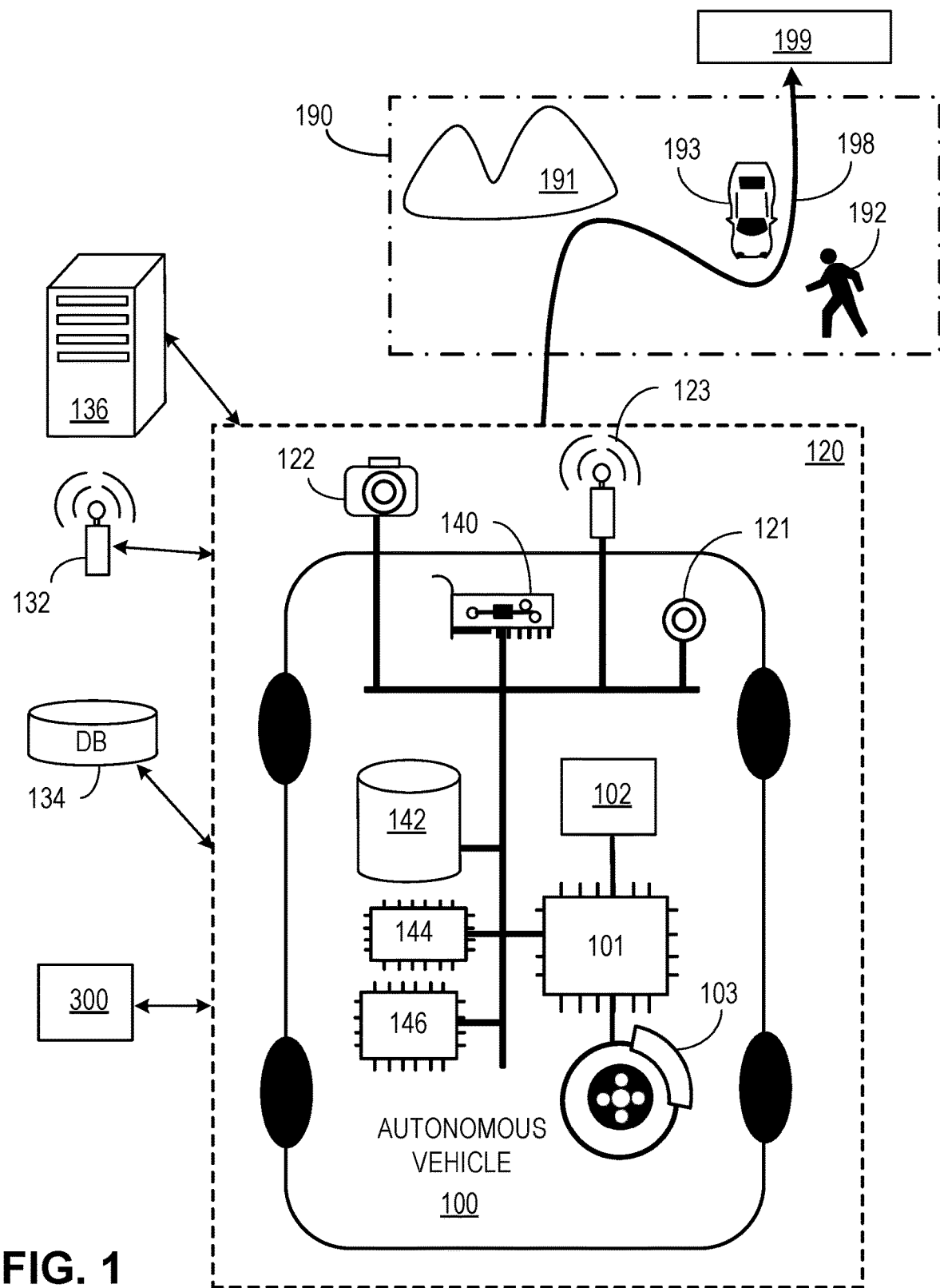
FIG. 1 shows an example of an AV having autonomous capability.

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview

3. AV Architecture
4. AV Inputs
5. AV Planning
6. AV Control
7. Augmented Reality Enabled AV Command Center General Overview One or more computer systems can control the operation of one or more AVs (e.g., a fleet of AVs). For example, a computer system can deploy AVs to one or more locations or regions, assign transportation tasks to each of the AVs, provide navigation instructions to each of the AVs, assign maintenance tasks to each of the AVs, and/or assign other tasks to each of the AVs.

Further, one or more computer systems can be used the monitor the operation of AVs. For example, a computer system can collect information from each of the AVs, process the collected information, and present the information to one or more users, such that the users can keep informed regarding the operation of the AVs.

In some implementations, a user can monitor and control a fleet of AVs using an augmented reality system. As an example, a user wears an augmented reality display device (e.g., a headset) while walking among a fleet of AVs. As the user approaches certain AVs, the display device presents a graphical user interface (GUI) that overlays information regarding the AVs in the field of view of the user (e.g., such that information relevant to a particular AV appears to be hovering near that AV). For instance, the display device can present information regarding the deployment status of the AVs, maintenance or repair issues related to the AVs, scheduling information regarding the AVs, or organizational information regarding the AVs. Further, the user can interact with the graphical user interface to perform particular tasks with respect to the AVs (e.g., by performing gestures that are mapped to particular commands).

Some of the advantages of these techniques include improving the speed, accuracy, and efficiency by which users can interact with a fleet of AVs. For example, an augmented reality system enables a user to intuitively retrieve information regarding specific AVs (e.g., by approaching and gazing at a particular AV), without requiring that the user manually input a selection. Further, the user can conduct tasks with respect to the AV without repeatedly averting their gaze to a handheld device.

As an example, when interacting with a system that does not utilize augmented reality, a user may repeatedly shift their gaze between one or more AVs and a handheld device. For instance, to select a particular AV on their handheld device, a user may review a list of AVs that is presented on a user interface of their handheld device. Further, the user may shift their gaze to the AV to determine identifying characteristics of the AV (e.g., an identifier on the AV, an appearance of the AV, a location of the AV, etc.), and shift their gaze back to the user interface of the handheld device to manually input filtering criteria (e.g., to filter the list according to the characteristics of the AV). Further, the user may manually select the particular AV from the filtered list using the handheld device.

Further, to retrieve specific types of information regarding the selected AV, the user may review one or more options presented on the user interface of their mobile device (e.g., each corresponding to a different type of information that can be presented), and manually select one of the options to retrieve the corresponding data. The user can verify that the retrieved information corresponds to the selected AV by shifting their gaze between the AV and the user interface (e.g., to identify possible errors or inconsistencies).

Further, to command the selected AV to perform a certain task, the user may review one or more options presented on the user interface of their mobile device (e.g., each corresponding to a different type of task that can be performed by the AV), and manually select one of the options to instruct the AV to perform the corresponding task. The user can verify that the AV is performing the selected task by to shifting their gaze between the AV and the user interface (e.g., to identify possible errors or inconsistencies).

In contrast, when interacting with one or more of the augmented reality systems described herein, a user can select a particular AV by gazing at the AV, approaching the AV, and/or allowing the AV to approach him, and selecting the AV while maintaining their gaze (e.g., by maintaining their gaze on the AV, and/or by performing a physical gesture with respect to the AV). Further, information regarding the AV can be presented such that the information appears to be floating on or around the AV, such that the user need not avert their gaze while reviewing the information. Further still, a user can command the selected AV to perform a certain task AV (e.g., by performing a gesture) without averting their gaze from the AV. Accordingly, the user can monitor and control an operation of an AV in a more efficient and intuitive manner, and a manner that is less likely to result in errors or oversights.

System Overview

FIG. 1 shows an example of an AV 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an AV (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

As used herein, "homotopy" means a subset of a set of constraints on a trajectory of an AV that the AV can adhere to while traversing a particular route.

As used herein, "feasible" means whether an AV can adhere to a constraint in a homotopy while traveling to a destination.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
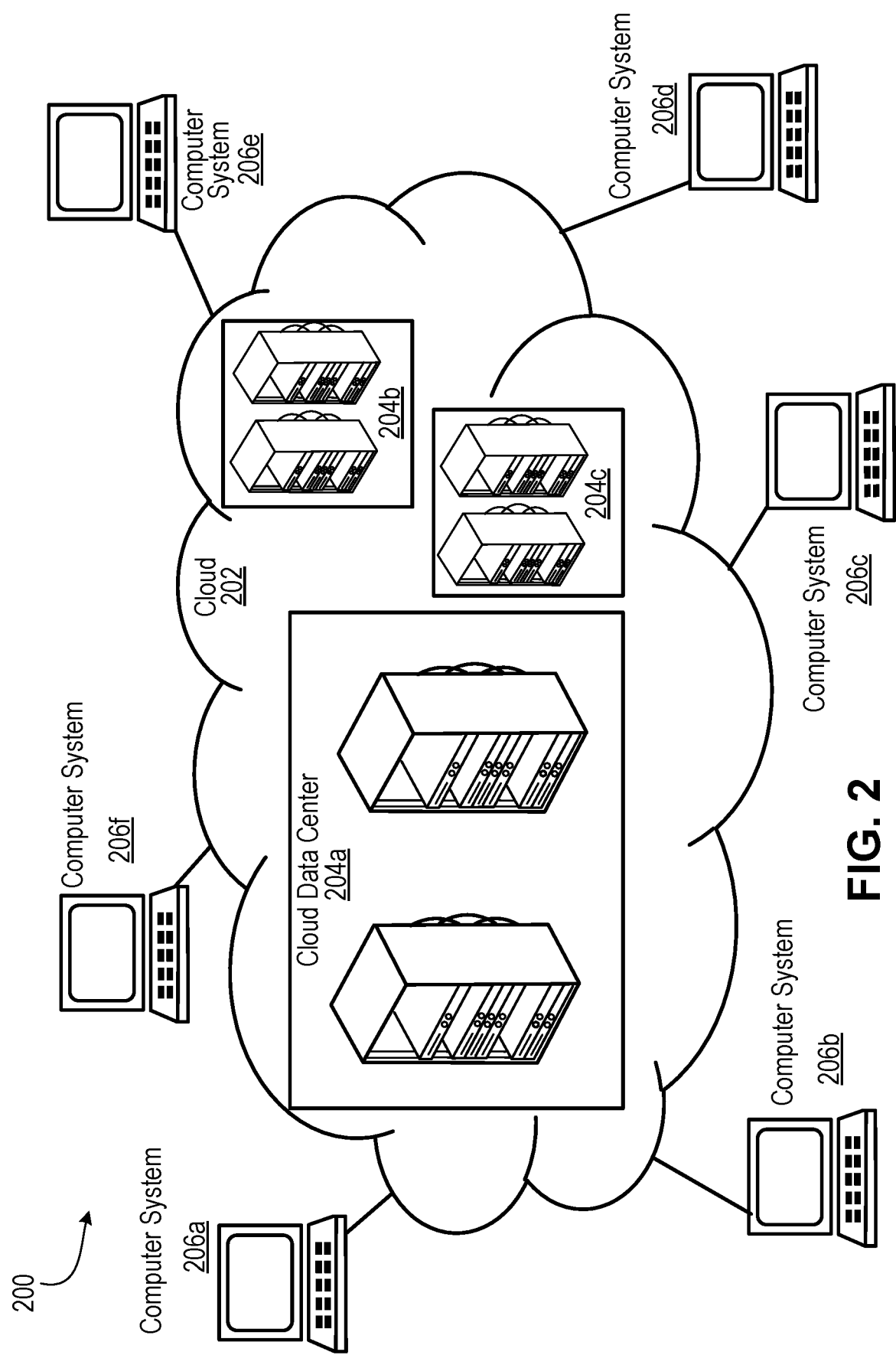
FIG. 2 shows an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
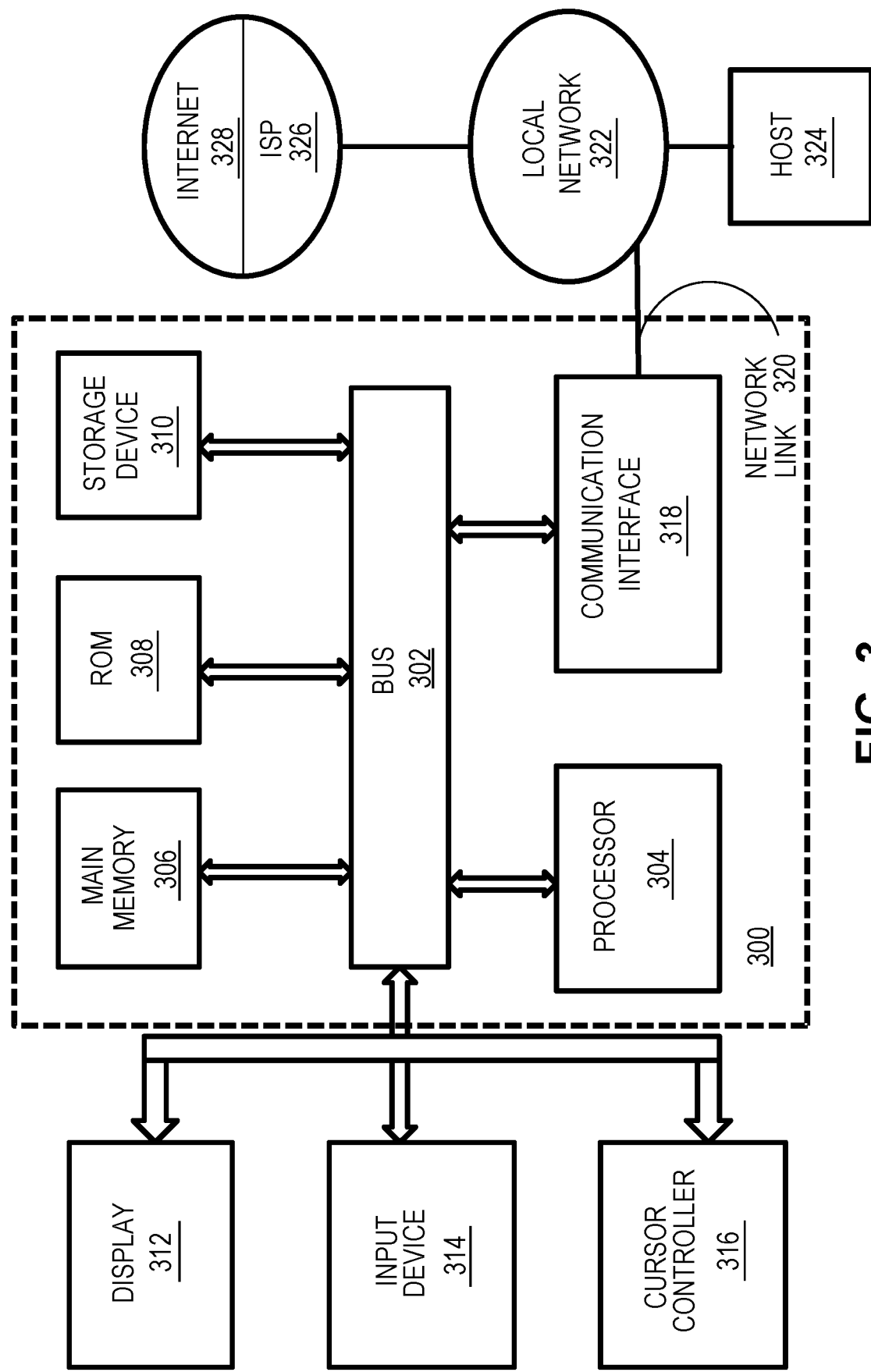
FIG. 3 shows a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but can be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

AV Architecture

Figure 4:
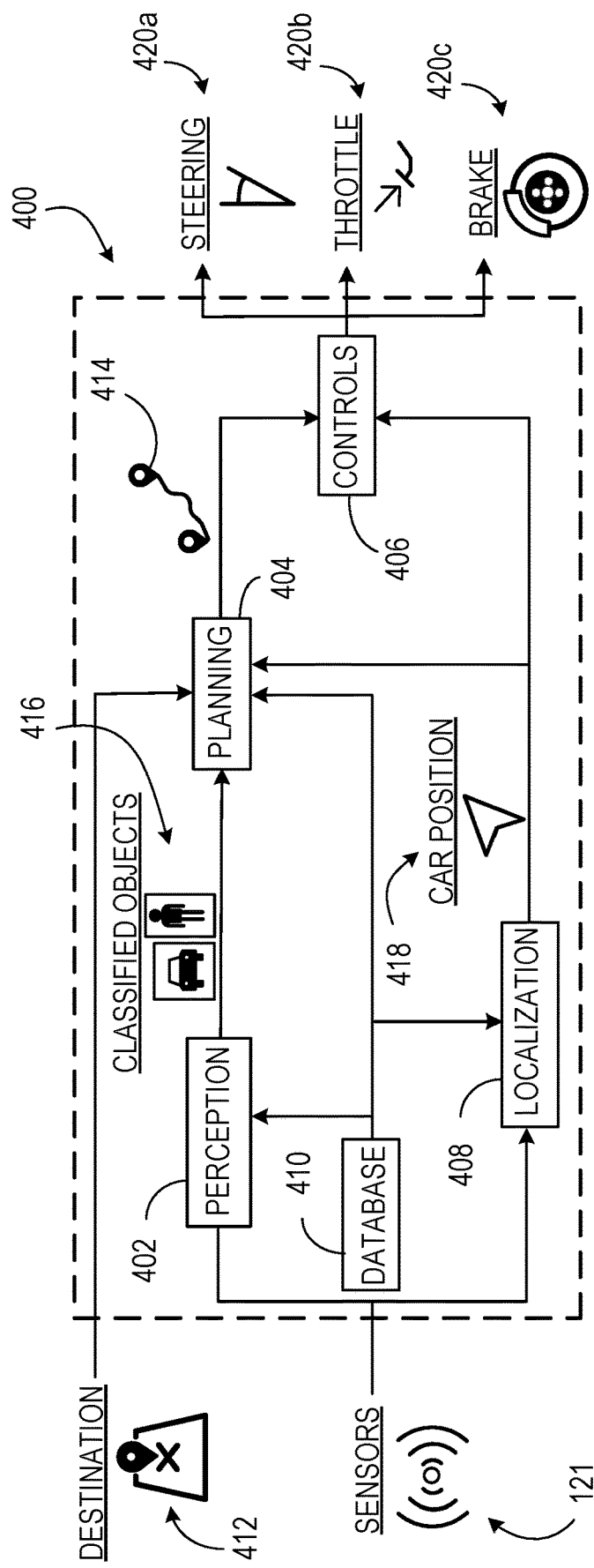
FIG. 4 shows an example architecture for an AV.

FIG. 4 shows an example architecture 400 for an AV (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 can be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition system) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

AV Inputs

Figure 5:
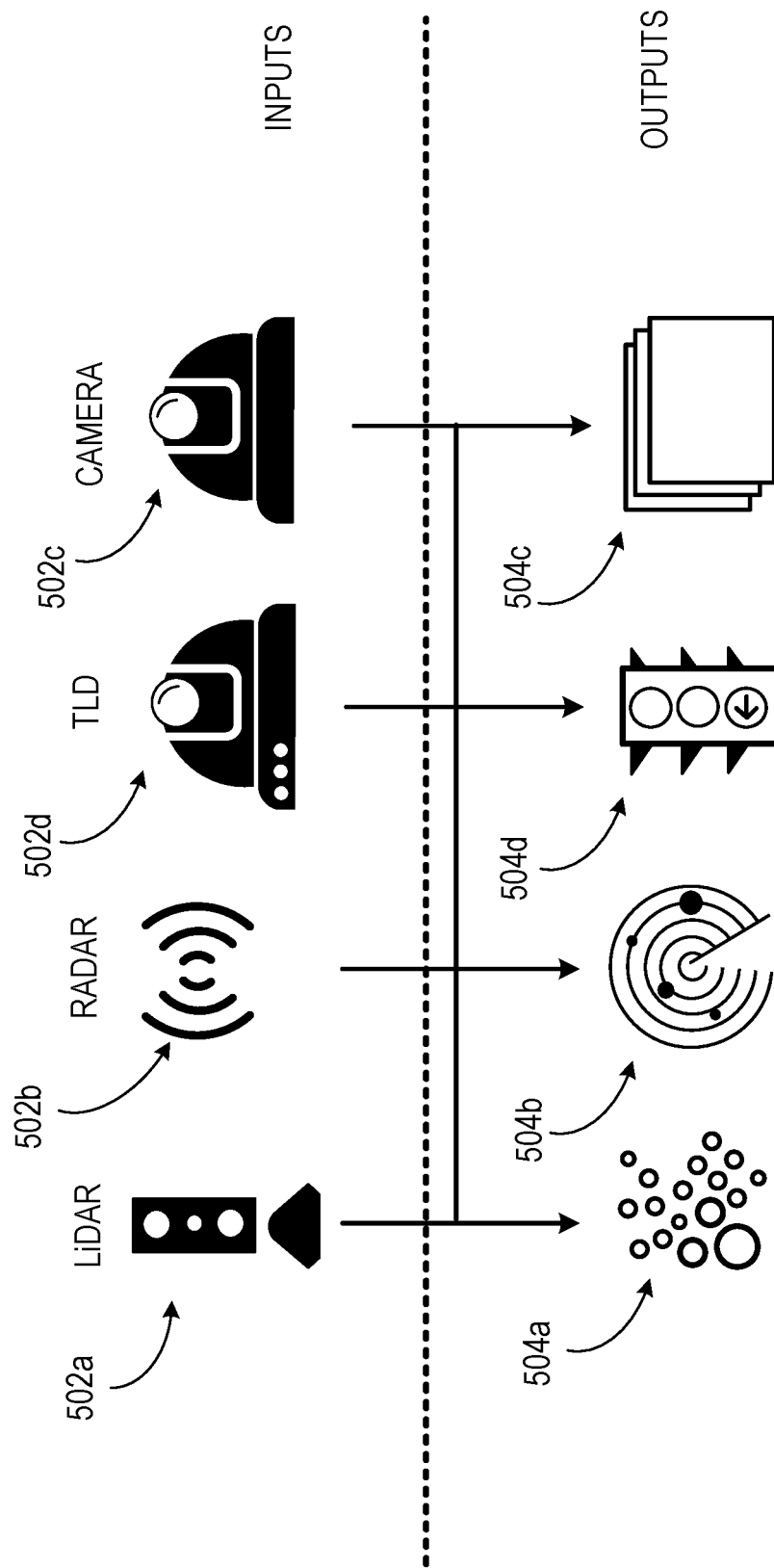
FIG. 5 shows an example of inputs and outputs that can be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
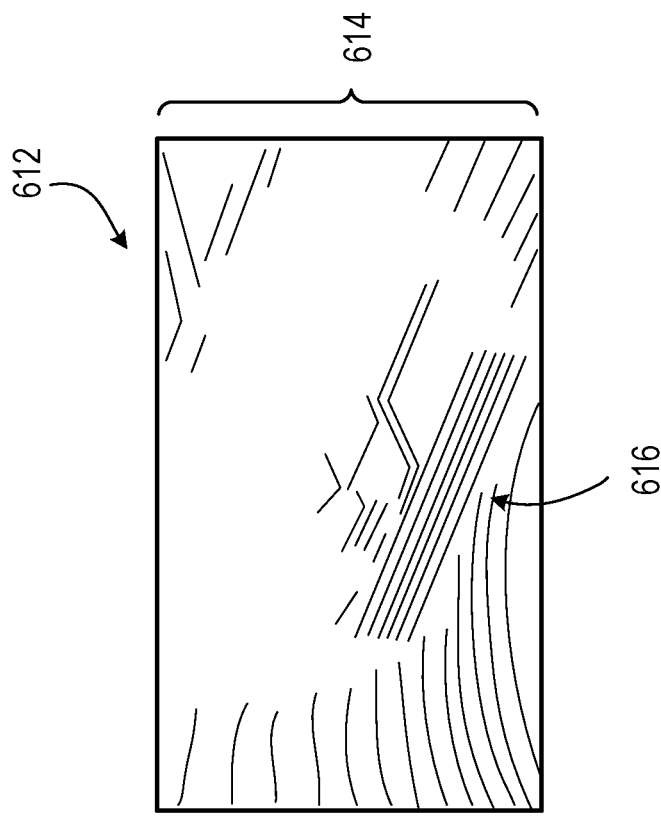
FIG. 6 shows an example of a LiDAR system.
Figure 6:
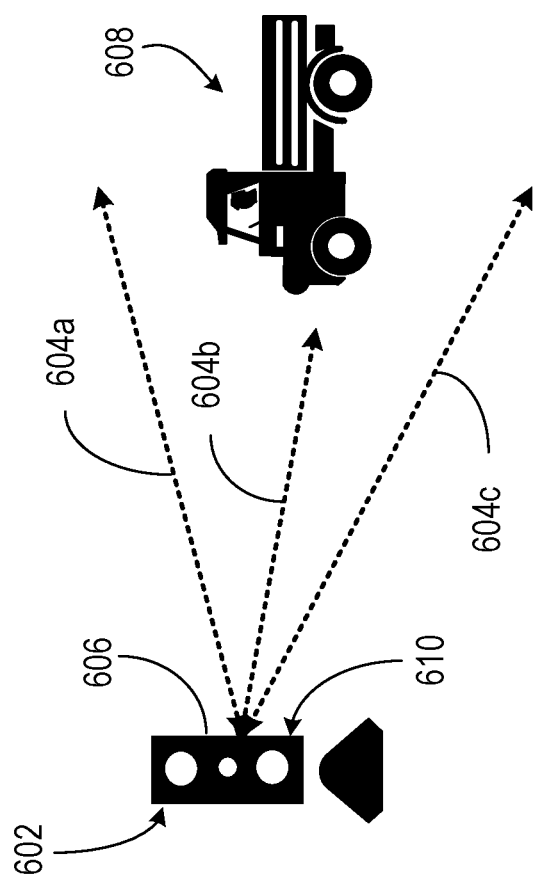

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light.

In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
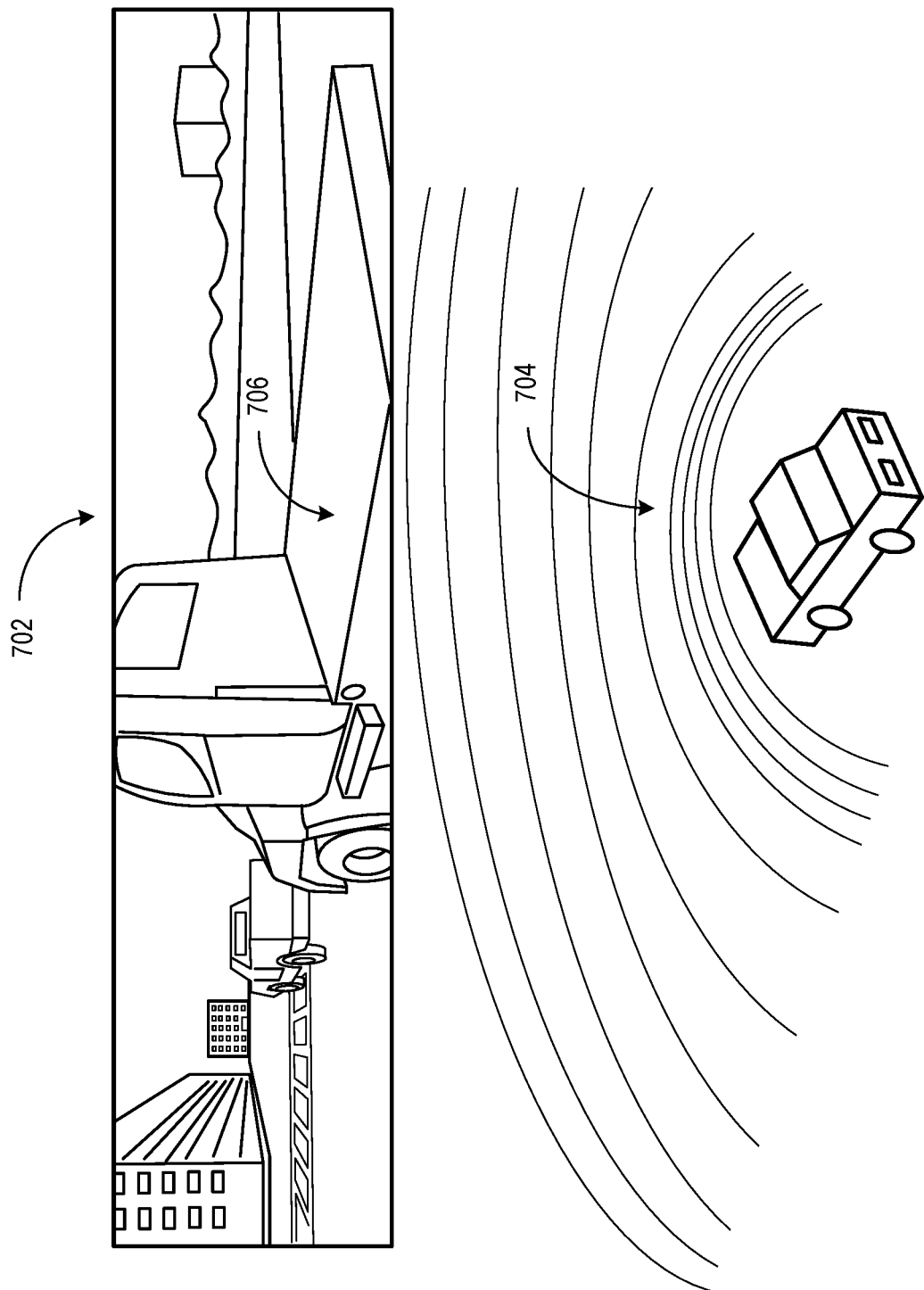
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
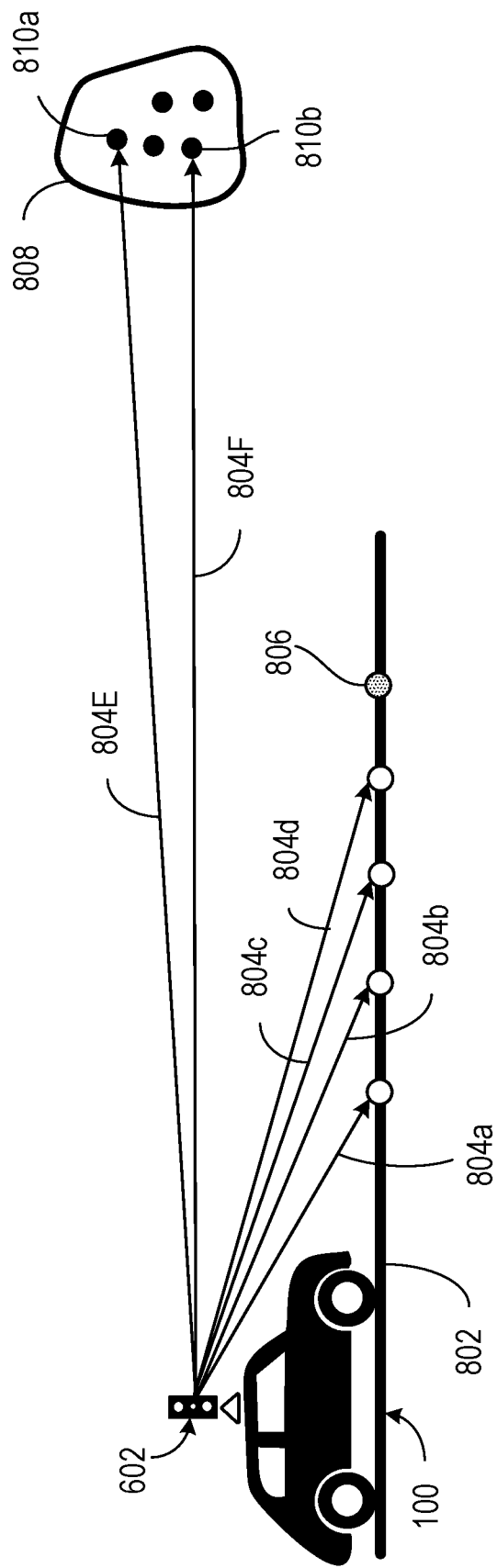
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
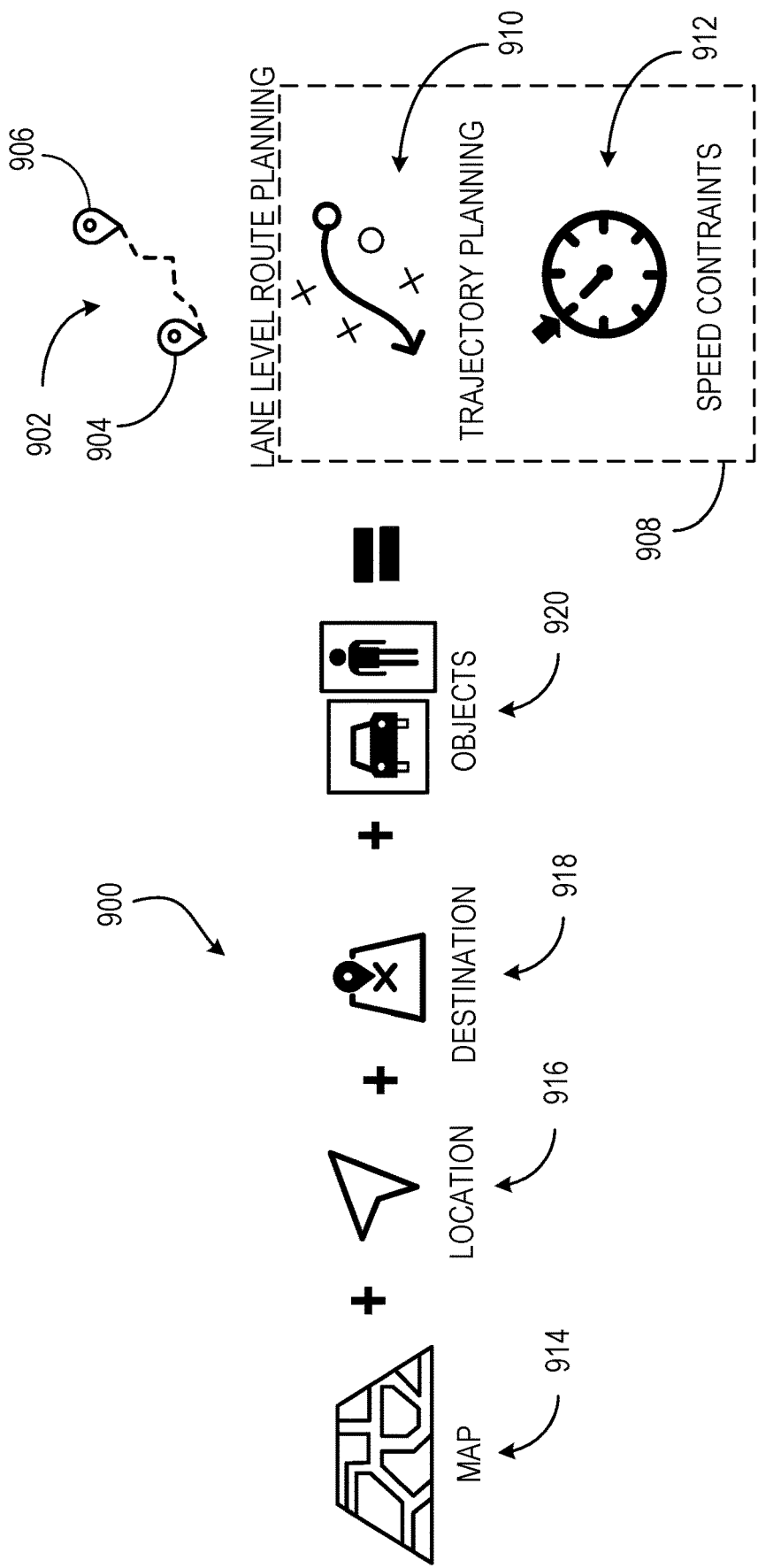
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 can limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning, also referred to as a "rulebook." Rules are specified using a formal language, e.g., using Boolean logic or linear temporal logic (LTL). In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
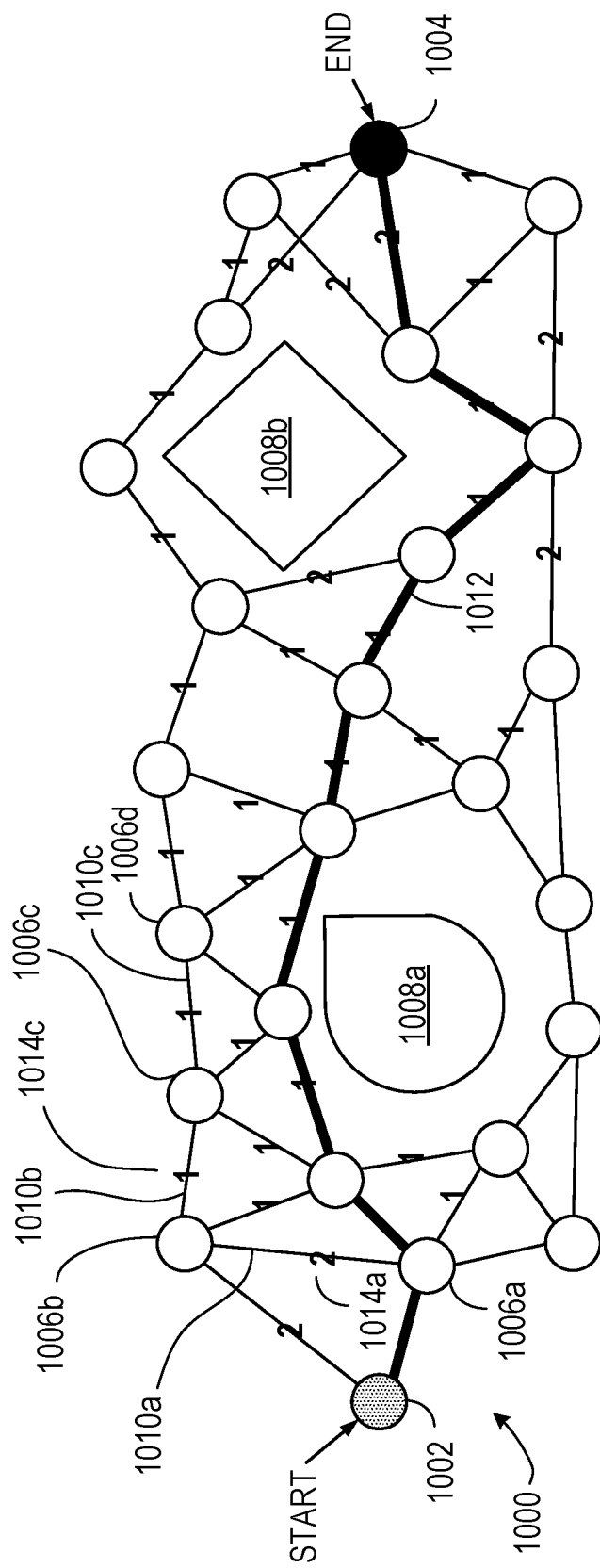
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 can be relatively large (e.g., in two different metropolitan areas) or can be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (i.e., the AV 100 travels between the two physical positions represented by the respective nodes). The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or map constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* can be twice the associated cost 1014*b* of the second edge 1010*b*. Other factors that affect time include expected traffic, number of intersections, speed limit, etc. Another typical resource is fuel economy. Two edges 1010*a-b* can represent the same physical distance, but one edge 1010*a* can require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

AV Control

Figure 11:
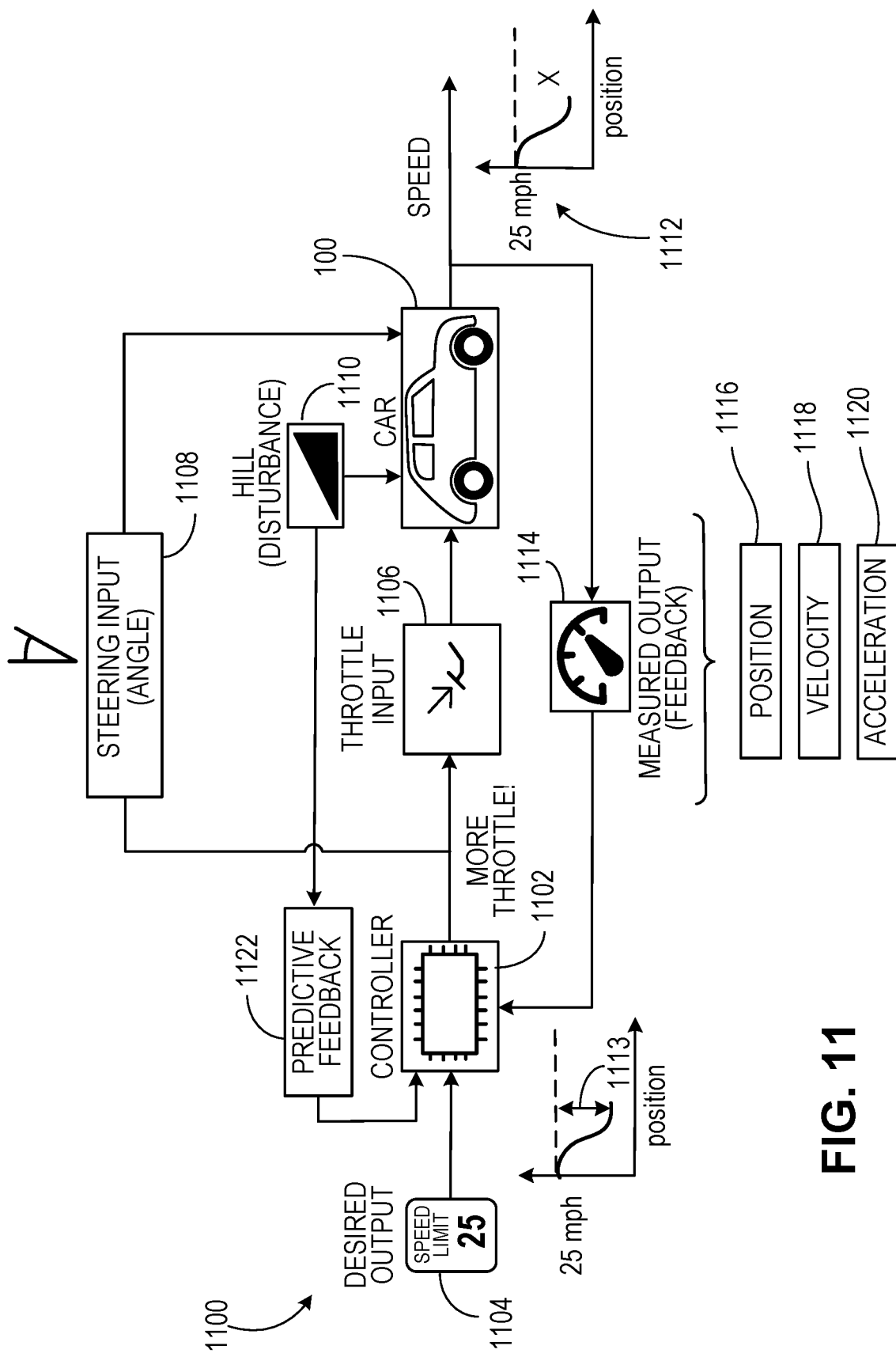
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
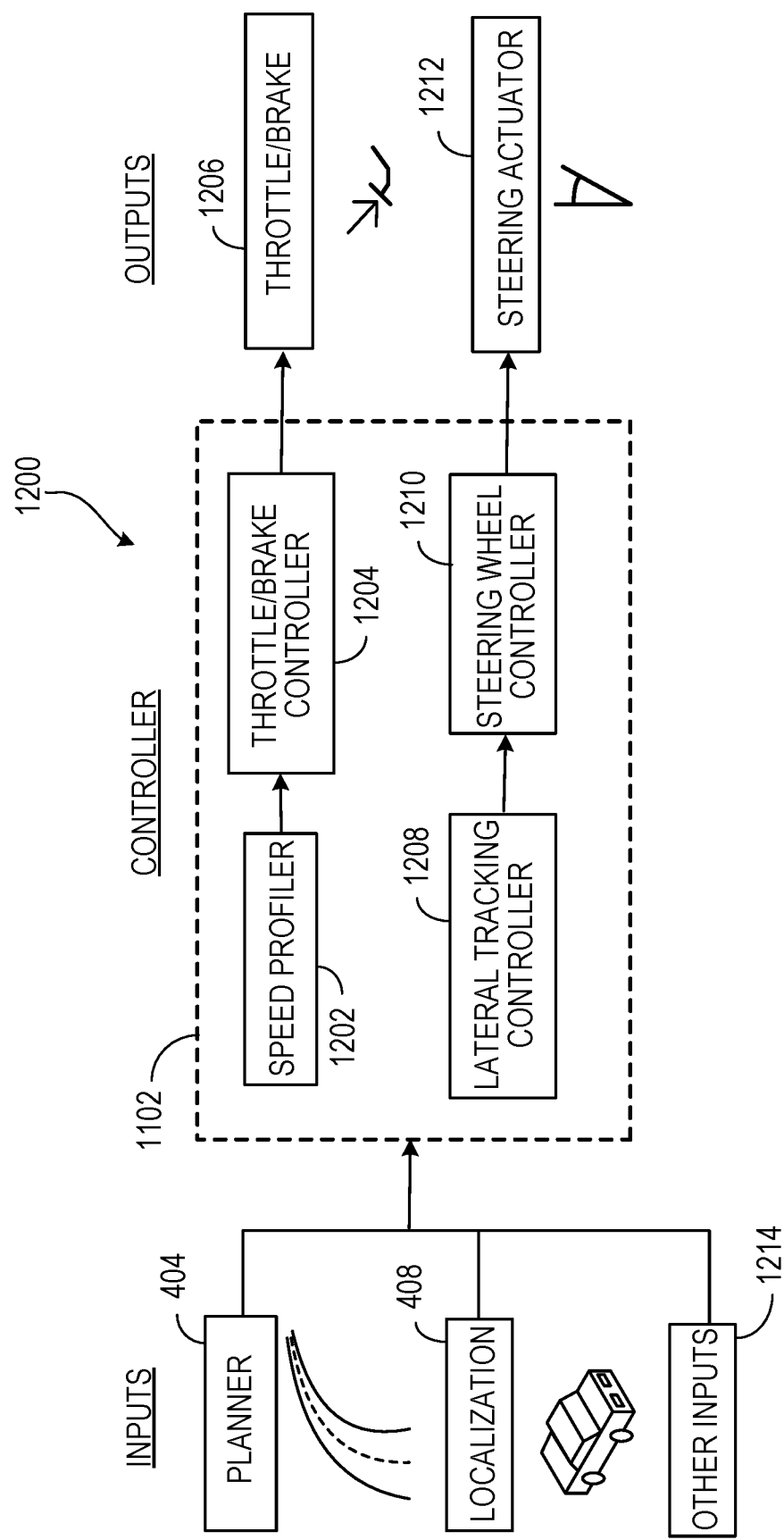
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Augmented Reality Enabled Autonomous Vehicle Command Center

One or more computer systems (e.g., a cloud server 136, a computing environment 200, and/or a computer system 300, as shown in FIGS. 1-3) can control the operation of one or more AVs. For example, one or more computer systems can deploy AVs to one or more locations or regions, assign transportation tasks to each of the AVs (e.g., pick up and transport passengers, pick up and transport cargo, etc.), provide navigation instructions to each of the AVs (e.g., provide a route or path between two locations, provide instructions to traverse objects in proximity to the AV, etc.), assign maintenance tasks to each of the AVs (e.g., charge their batteries at charging stations, receive repairs at a service station, etc.), and/or assign other tasks to each of the AVs.

Further, one or more computer systems can be used the monitor the operation of AVs. For example, one or more computer systems can collect information from each of the AVs (e.g., vehicle telemetry data, such as data regarding a vehicle's speed, heading, acceleration, location, fuel or battery level, sensor measurements, status, or other aspects of a vehicle's operation, as described herein), process the collected information, and present the information to one or more users (e.g., in the form of an interactive graphical user interface), such that the users can keep informed regarding the operation of the AVs.

In some implementations, a user can monitor and control a fleet of AVs using an augmented reality system implemented, at least in part, by the one or more computer systems. As an example, a user can wear an augmented reality display device (e.g., a headset) while walking among a fleet of AVs. As the user approaches certain AVs, the display device presents a graphical user interface (GUI) that overlays information regarding the AVs in the field of view of the user (e.g., such that information relevant to a particular AV appears to be hovering near that AV). For instance, the display device can present information regarding the deployment status of the AVs, maintenance or repair issues related to the AVs, scheduling information regarding the AVs, or organizational information regarding the AVs. Further, the user can interact with the graphical user interface to perform particular tasks with respect to the AVs (e.g., by performing gestures that are mapped to particular commands).

In some implementations, use of an augmented reality system can improve the speed, accuracy, and efficiency by which users can interact with a fleet of AVs. For example, an augmented reality system enables a user to intuitively retrieve information regarding specific AVs (e.g., by approaching and gazing at a particular AV), without requiring that the user manually input a selection. Further, the user can conduct tasks with respect to the AV without repeatedly averting their gaze to a handheld device.

Figure 13:
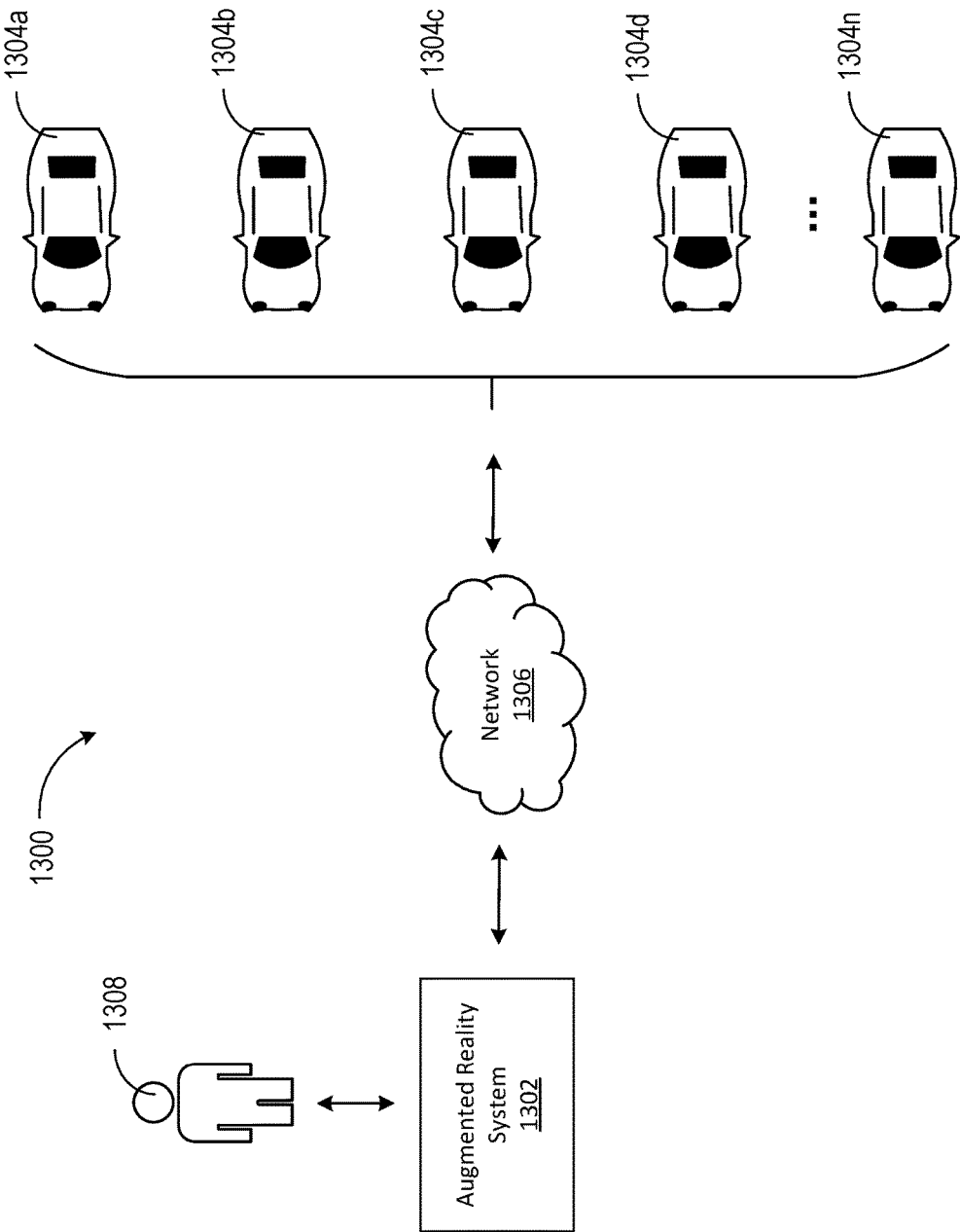
FIG. 13 shows an example system including an augmented reality system for monitoring and controlling an operation of several AVs.

FIG. 13 shows an example system 1300 including an augmented reality system 1302 for monitoring and controlling an operation of several AVs 1304a-1304n. The augmented reality system 1302 is communicatively coupled to the AVs 1304a-1304n by a network 1306.

In some implementations, the augmented reality system 1302 can be implemented, at least in part, using one or more computer systems (e.g., one or more cloud servers 136, one or more computing environments 200, and/or one or more computer systems 300, as shown in FIGS. 1-3). Further, in some implementations, one or more of the AVs 1304a-1304n can be similar to the AV 100 (e.g., as shown in FIG. 1). Further, the network 1306 can be implemented, at least in part, using one or more local networks (e.g., the local network 332 shown in FIG. 3) and/or the Internet (e.g., the Internet 328 shown in FIG. 3).

During an example usage of the system 1300, the augmented reality system 1302 receives information regarding the AVs 1304a-1304n (e.g., via the network 1306), and presents at least some of the information to a user 1308. For instance, the information can include vehicle telemetry data regarding the AVs 1304a-1304n, data regarding a deployment status of the AVs 1304a-1304n, data regarding maintenance or repair issues related to the AVs 1304a-1304n, scheduling information regarding the AVs 1304a-1304n, organizational information regarding the AVs 1304a-1304n, and/or any other information described herein.

At least some of this information can presented to the user 1308 visually using an augmented reality GUI. For example, the GUI can be presented to the user 1308 using an augmented reality display device (e.g., a headset worn by the user) that presents computer-generated information in the field of view of the user, such that the information appears to reside in the physical environment of the user 1308. For instance, the information can be presented such that the information appears to be positioned spatially in the physical environment alongside one or more physical objects. As an example, the augmented reality display device can overlay one or more graphical user interface elements in a field of view of the user 1308, such that information relevant to a particular AV 1304a-1304n appears to be arranged spatially proximal to the AV 1304a-1304n (e.g., hovering or floating near that AV).

Further, the augmented reality system 1302 transmits information to the AVs 1304a-1304n (e.g., via the network 1306). For instance, the information can include commands from the user 1308 to one or more of the AVs 1304a-1304n, such as commands to perform certain tasks. Example tasks include deploying to one or more locations or regions, picking up and transporting passengers, picking up and transporting cargo, traversing particular routes or paths between two locations, traversing objection in proximity to the AVs, performing maintenance activities (e.g., charging the batteries of the AVs at charging stations, receiving repairs at a service station, etc.), and/or any other tasks described herein.

At least some the commands can be communicated by the user 1308 to the augmented reality system 1302 using one or more input devices and/or by performing one or more physical gestures. For example, a user 1308 can input one or more commands via a keyboard, a mouse, a trackpad, a touch-sensitive display device (e.g., a touch screen), a joystick, a gamepad, a button, a lever, and/or another input device. As another example, a user 1308 can move one or more portions of their body (e.g., a finger, a hand, an arm, a foot, a leg, a head, etc.) to perform a physical gesture. The augmented reality system 1302 can detect the gesture (e.g., using one or more sensors), determine one or more commands associated with the gesture, determine the AV or AVs 1304a-1304n to which the gesture is directed, and transmit the commands to the appropriate AVs 1304a-1304n for execution.

In some implementations, the augmented reality system 1302 can identify the AV or AVs 1304a-1304n to which a gesture is directed by determining a direction or orientation in which the gesture was directed, and identifying one or more of the AVs corresponding to that direction or orientation. For example, if the gesture is a pointing motion by the user 1308, the augmented reality system 1302 can determine one or more of the AVs 1304a-1304n in the direction to which the user is pointing. As another example, if the gesture is a pinching motion by the user 1308, the augmented reality system 1302 can determine one or more of the AVs 1304a-1034n in the direction that the user is pinching. As another example, if the gesture is a waving motion by the user 1308, the augmented reality system 1302 can determine one or more of the AVs 1304a-1034n in the direction that the user is waving.

In some implementations, the augmented reality system 1302 can identify the AV or AVs 1304a-1304n to which a gesture is directed by determining a direction in which the user is gazing and/or an orientation of the user (e.g., the user's head) while the user is performing the gesture, and identifying one or more of the AVs corresponding to that direction or orientation. In some implementations, the augmented reality system 1302 can make this determining by detecting an orientation of a user's head with respect to the user's environment (e.g., using one or more sensor secured to the user's head) and/or tracking a user's eyes (e.g., using one or more tracking sensors directed towards the user's eyes).

Figure 14A:
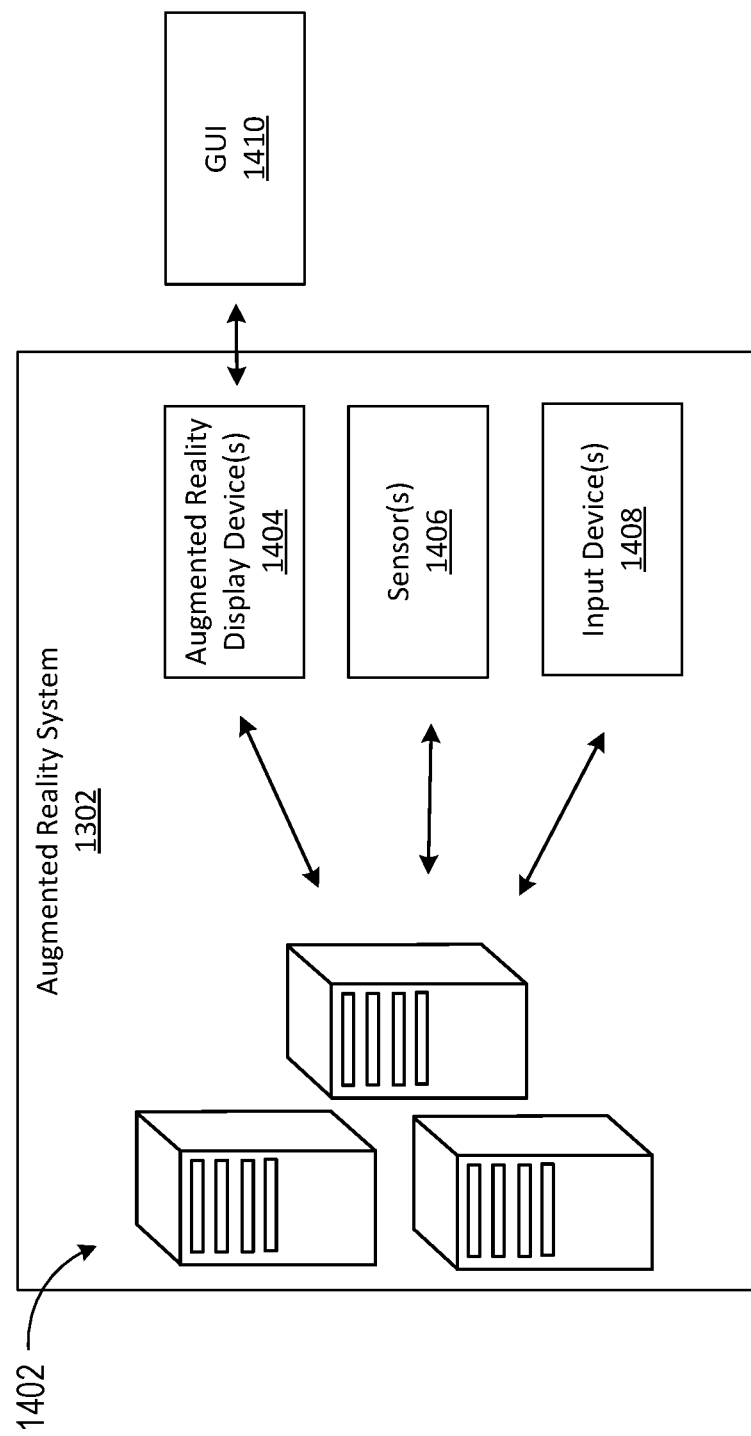
FIG. 14A shows an example augmented reality system.

An example augmented reality system 1302 is shown in greater detail in FIG. 14A. The augmented reality system 1302a includes one or more computer systems 1402, one or more augmented reality display devices 1404, one or more sensors 1406, and one or more input devices 1408.

The one or more computer system 1402 receive information (e.g., from the AVs 1304a-1304n, the user 1308, and/or other systems described herein), process information, and transmit information (e.g., to the AVs 1304a-1304n, the user 1308, and/or other systems described herein). In some implementations, the computer system 1402 can be implemented, at least in part, using one or more cloud servers 136, one or more computing environments 200, and/or one or more computer systems 300 (e.g., as shown in FIGS. 1-3).

Figure 14B:
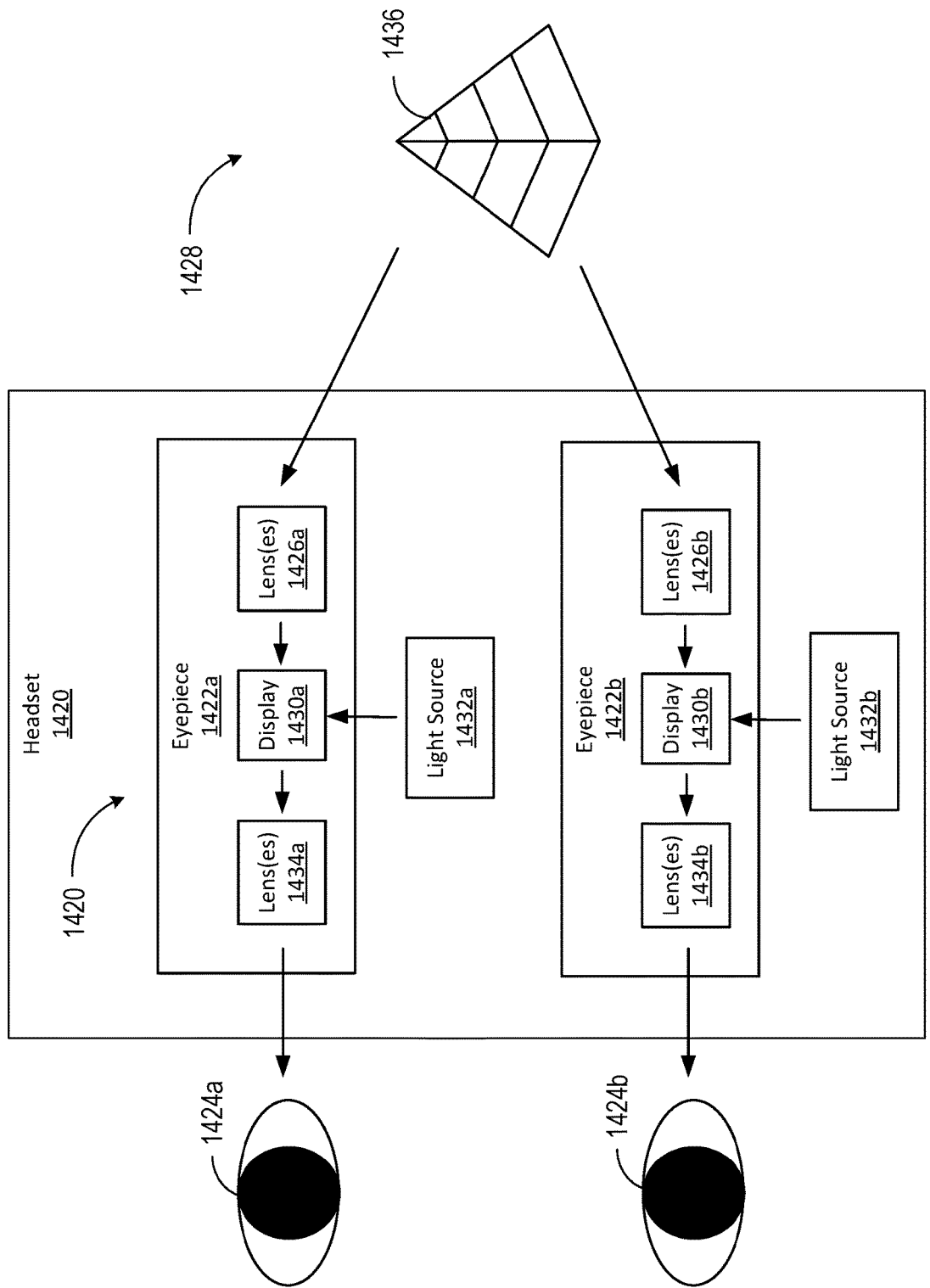
FIG. 14B shows an example headset for an augmented reality system.

Each of the augmented reality display devices 1404 receives information from the one or more computer systems 1402, and presents at least some of the information using a GUI 1410. As described above, in some implementations, an augmented reality display device 1404 can include a headset to facilitate the presentation of the GUI 1410. For example, as shown in FIG. 14B, an augmented reality display device 1404 can include a headset 1420 having two eyepieces 1422a and 1422b. When the headset 1420 is worn by the user 1308, the eyepieces 1422a and 1422b are positioned over the eyes of the user 1308 (e.g., the user's left eye 1424a and right eye 1424b, respectively) and provide visual information to the user (e.g., by projecting light into the user's eyes 1424a and 1424b). In some embodiments, eyepieces 1422a, 1422b can include two areas on a display (e.g., two overlapping areas on a display, two distinct areas of a display, etc.).

In this example, the eyepiece 1422a includes one or more lenses 1426a that receive light from a physical environment 1428 of a user and provide at least some of the received light to a display 1430a. The display 1430a combines the light received from the physical environment 1428 with light generated by a light source 1432a, and provides the combined light to one or more lenses 1434a. The one or more lenses 1434a direct and focus the light onto the user's eye 1424a (e.g., such that the user can perceive the light received from both the light source 1432a and the physical environment 1428 concurrently).

Further, the eyepiece 1422a and the light source 1432a can be configured such that one or more elements of the GUI 1410 are overlaid in a field of view of the user (e.g., such that the elements of the GUI 1410 appear to be positioned spatially in the physical environment alongside one or more physical objects 1436 in the physical environment 1428). For example, the light source 1432a can be configured to generate a spatially varying pattern of light representing the GUI 1410. Further, the eyepiece 1422a can be configured to combine the light generated by the light source 1432a with the light received from the physical environment 1428, such that the GUI 1410 appears to be positioned at a particular spatial position relative to the user. This combined light can be provided to the user's eye 1424a, such that the user can view both the GUI 1410 and the physical environment 1428 concurrently.

Further, the headset 1420 can include multiple eyepieces to present information according to a particular perceived depth relative to the user. For example, the eyepiece 1422b can perform in a similar manner as the eyepiece 1422a to provide light to the user's eye 1424b. For example, the eyepiece 1422b can include one or more lenses 1426b that receive light from the physical environment 1428, and provide at least some of the received light to a display 1430b. The display 1430b combines the light received from the physical environment 1428 with light generated by a light source 1432b, and provides the combined light to one or more lenses 1434b. The one or more lenses 1434b direct and focus the light onto the user's eye 1424b (e.g., such that the user can perceive the light received from both the light source 1432b and the physical environment 1428 concurrently).

Further, the light generated by the light source 1432a and the light generated by the light source 1432b can be different from one another, such that the GUI 1410 is presented according to a particular depth relative to the user. For example, the light source 1432a can generate a first spatial pattern of light representing the GUI 1410 when viewed from a first perspective (e.g., the left eye 1424a), and the light source 1432b can generate a second spatial pattern of light representing the GUI 1410 when viewed from a second perspective (e.g., the right eye 1424b). When the user views light from the eyepieces 1422a and 1422b concurrently, the light received by each of the user's eyes 1424a and 1424b corresponds to a different respective perspective of the GUI 1410 in three-dimensions. Accordingly, the GUI 1410 appears to have a particular depth with respect to the user and the physical environment 1428.

In some implementations, the eyepieces 1422a and 1422b can include two areas on a display (e.g., two overlapping areas on a display, two distinct areas of a display, etc.). Further, the headset 1420 can be configured such that each area of the display is presented to a different one of the user's eyes 1424a and 1424b. For example, the eyepieces 1422a and 1422b can include two areas on a display of a mobile device (e.g., a smart phone). For example, the headset 1420 can be configured such that, when the headset is worn by the user, a first area of the display is visible to the user's eye 1424a and not visible to the user's eye 1424b, and the second area of the display is visible to the user's eye 1424b and not visible to the user's eye 142a. Further, in some implementations, the eyepieces 1422a and 1422b not include one or more of the lenses 1434a, 1434b, 1426, or 1426b.

FIG. 14C shows an example GUI 1410 presented by the augmented reality system 1302. In this example, a user 1308 wearing a headset 1420 of the augmented reality system 1302 perceives the user's physical environment 1428 (e.g., including an AV 1304a) and the GUI 1410 concurrently in their field of view 1412. Further, the GUI 1410 includes several graphical elements 1414 (e.g., patterns of icons, symbols, images, text, and/or colors) that appear to be positioned within the physical environment 1428 of the user, such that the graphical elements 1414 are hovering or floating in proximity to the AV 1304a. The graphical elements 1414 can include (e.g., represent) information regarding the AV 1304a (e.g., as described herein).

As the user moves their head, the augmented reality system 1302 can adjust the GUI 1410 to account for the user's movements. For example, referring back to FIG. 14A, the augmented reality system 1302 can include one or more sensors 1406 that detect the position, the orientation, and/or a movement of the user's head and/or other portions of the user's body, relative to the physical environment 1428. The sensors 1406 can include, for example, one or more accelerometers, gyroscopes, depth sensors, RADAR sensors, LIDAR sensors, video cameras, static cameras, photodetectors, location sensors (e.g., GPS or GNSS sensors), or other sensors. The sensors 1406 can be configured to determine the location, the orientation and/or the movement of a user's head, one or more other portions of the user's body, one or more objects in the physical environment 1428 of the user, or a combination thereof.

As the user moves their head, the augmented reality system 1302 can adjust the GUI 1410 such that the graphical elements 1414 appear to move with the objects in the user's field of view 1412. For example, referring to FIG. 14C, if the user rotates their head to the left, the user perceives that the AV 1304a has shifted to the right in their field of view 1412. Correspondingly, the augmented reality system 1302 can adjust the GUI 1410 such that the graphical elements 1414 also appear to shift to the right in the user's field of view 1412 (e.g., such that the graphical elements 1414 continue to appear to be hovering or floating by the AV 1304a). As another example, if the user moves forward, the user perceives that the AV 1304a has shifted nearer to the user in the user's field of view 1412. Correspondingly, the augmented reality system 1302 can adjust the GUI 1410 such that the graphical elements 1414 also appear to shift nearing to the user in the user's field of view 1412 (e.g., such that the graphical elements 1414 continue to appear to be hovering or floating by the AV 1304a).

Further, the user can interact with the augmented reality system 1302 to issue one or more commands with respect to the AV 1304a. For example, referring back to FIG. 14A, the augmented reality system 1302 can include one or more input devices 1408 for receiving input from the user 1308. Examples of the input devices 1408 include keyboards, mice, trackpads, touch-sensitive display devices (e.g., touch screens), joysticks, gamepads, button, levers, and other input devices. Inputs received by the input devices 1408 can be provided to the one or more computer systems 1402 for interpretation. For example, the one or more computer systems 1402 can identify one or more commands associated with (e.g., corresponding to) the inputs, and transmit the commands to the AV 1304a for execution.

As another example, a user 1308 can move one or more portions of their body (e.g., a finger, a hand, an arm, a foot, a leg, a head, etc.) to perform a physical gesture. The augmented reality system 1302 can detect the gesture (e.g., using one or more of the sensors 1406), determine one or more commands associated with the gesture, and transmit the commands to the AV 1304a for execution.

The user 1308 can use the augmented reality system 1302 to monitor and control an operation any aspect of an AV 1304a-1304n. For instance, the user 1308 can use the augmented reality system 1302 to monitor and control a maintenance or a repair of an AV 1304a-1304n, a deployment of an AV 1304a-1304n to a particular location or region, and/or an organization of an AV 1304a-1304n.

Figure 15A:
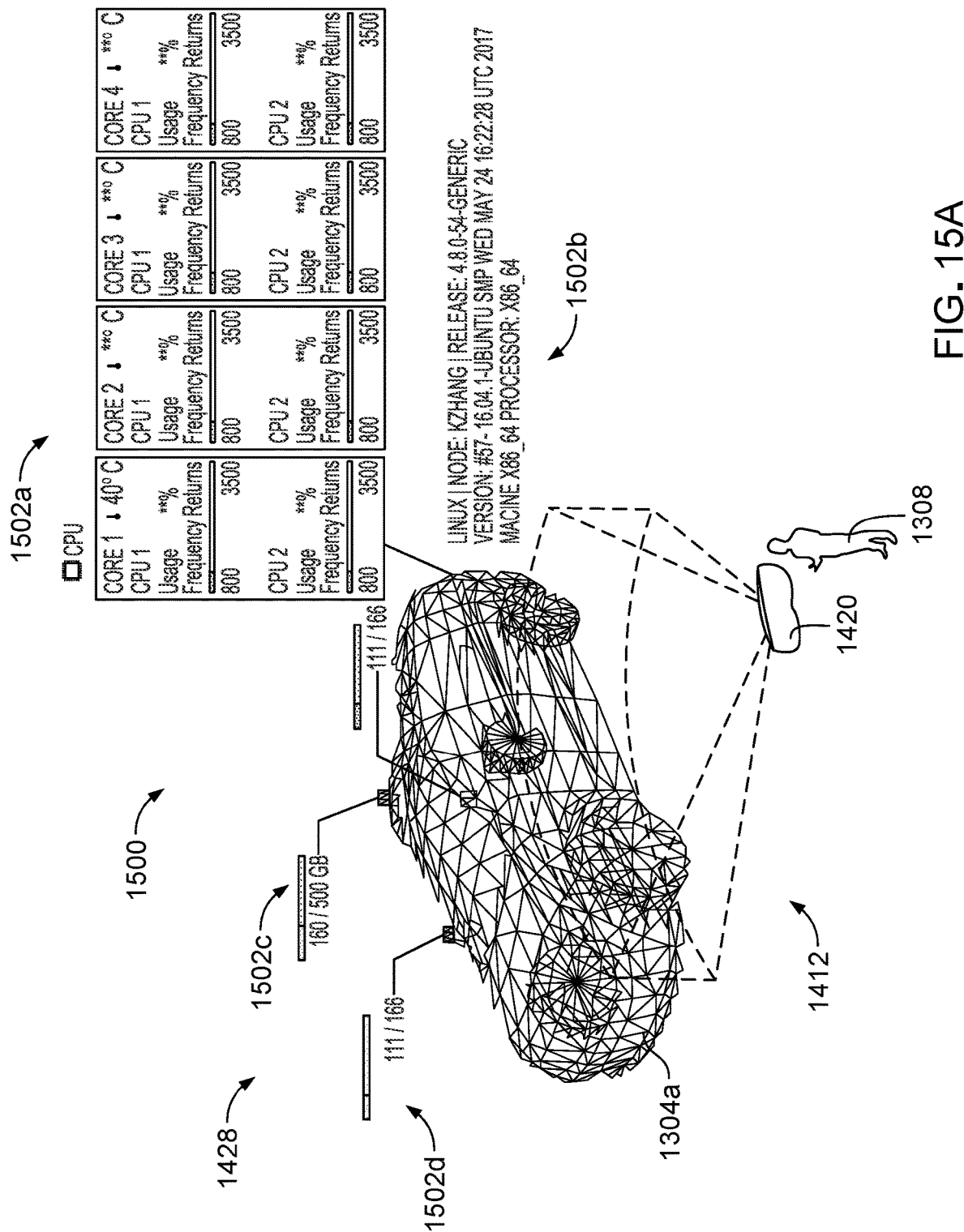
FIGS. 15A-15C show further example GUIs that can be presented by an augmented reality system.

As an example, the user 1308 can use the augmented reality system 1302 to monitor and control a maintenance or a repair of an AV 1304a-1304n. For example, FIG. 15A shows an example GUI 1500 presented by the augmented reality system 1302. In this example, a user 1308 wearing a headset 1420 of the augmented reality system 1302 perceives their physical environment 1428 (e.g., including an AV 1304a) and the GUI 1500 concurrently in their field of view 1412. Further, the GUI 1500 includes several graphical elements 1502 (e.g., patterns of icons, symbols, images, text, and/or colors) that appear to be positioned within the physical environment 1428 of the user, such that the graphical elements 1502 are hovering or floating in proximity to the AV 1304a.

As an example, as shown in FIG. 15A, a graphical element 1502a can display information regarding one or more processors of the AV 1304a (e.g., one or more of the processors 146). For instance, the graphical element 1502a can display, for each of the processors, a temperature of the processor, a usage or utilization percentage of the processor, a frequency or clock speed of the processor. In some implementations, the graphical element 1502a can be displayed such that the graphical element 1502a appears to be positioned at or in proximity to the physical location of the processors of the AV 1304a. In some implementations, the graphical element 1502a can be displayed such that the graphical element indicates the physical location of the processors of the AV 1304a (e.g., using an indicator line).

As another example, as shown in FIG. 15A, a graphical element 1502b can display information regarding operating system of the AV 1304a. For instance, the graphical element 1502a can display the type of operation system (e.g., Linux®, Unix®, Microsoft® Windows®, Apple® macOS®, etc.), and a version number or a revision number of the operating system. As another example, the graphical element 1502b can display a computer architecture associated with the operating system and/or the processors of the AV 1304a (e.g., x86, ARM, etc.).

As another example, as shown in FIG. 15A, graphical elements 1502c and 1502d can display information regarding one or more data storage units of the AV 1304a (e.g., one or more of the data storage units 142). For instance, the graphical elements 1502c and 1502d can display, for each of the data storage units, a total storage space of the data storage unit, the amount of free storage space of the data storage unit available for use, and the amount of storage space of the data storage unit that is currently being used. In some implementations, the graphical elements 1502c and 1502d can be displayed such that the graphical elements 1502c and 1502d appear to be positioned at or in proximity to (e.g., within a certain distance of) the physical location of the data storage units 142 of the AV 1304a. In some implementations, the graphical elements 1502c and 1502d can be displayed such that the graphical elements 1502c and 1502d indicate the physical location of the data storage units of the AV 1304a (e.g., using an indicator line).

Figure 15B:
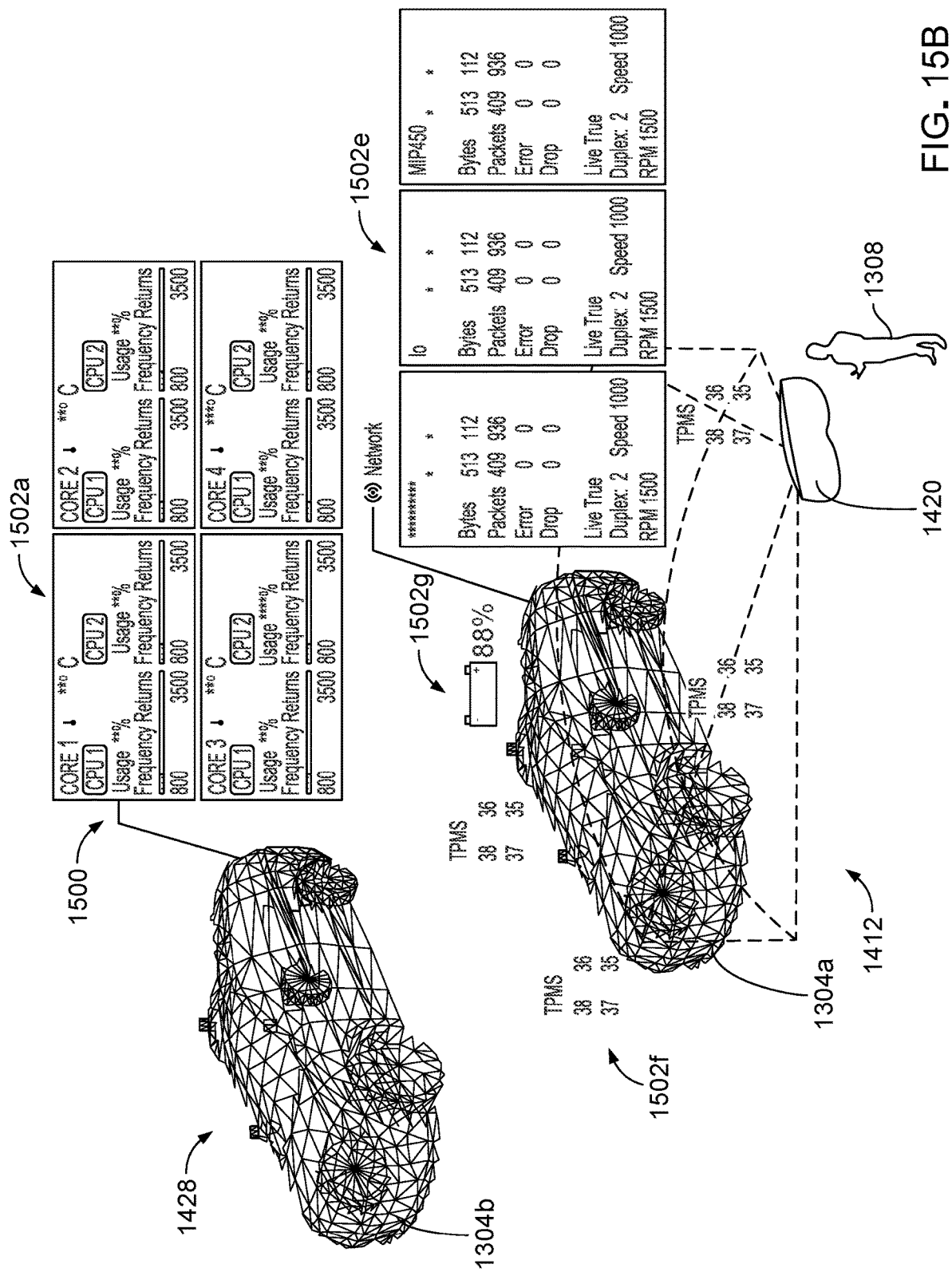

As another example, as shown in FIG. 15B, a graphical element 1502e can display information regarding data transmissions to and/or from the AV 1304a (e.g., using the communications interface 318 to communicate with the networks 322, 328, and/or 1306). For instance, the graphical element 1502e can display whether the AV 1304a is currently connected to a network (e.g., by displaying a "live" label). Further, the graphical element 1502e can display, an amount of data transmitted to and/or from the AV 1304a (e.g., in units of bytes and/or packets). Further, the graphical element 1502e can display a number of errors experienced while transmitting data to and/or from the AV 1304a. Further, the graphical element 1502e can display a number of packets that were "dropped" while transmitting data to and/or from the AV 1304a (e.g., packets that did failed to reach their intended destination, such as due to errors in data transmission or network congestion). Further, the graphical element 1502e can display a bandwidth or data throughput of a network link between the AV 1304a and the network (e.g., the network link 320). Further, the graphical element 1502e can display a maximum transmission unit (MTU) that can be used to transmit data using the network link. Further, the graphical element 1502e can display an indication of whether the network link is configured for duplex communications (e.g., such that parties on each end of the network link can communicate with each other simultaneously) or half-duplex (e.g., such that the parties can communicate with each other, but not simultaneously). In some implementations, the graphical element 1502e can be displayed such that the graphical element 1502e appears to be positioned at or in proximity to the physical location of the communications interface of the AV 1304a. In some implementations, the graphical element 1502e can be displayed such that the graphical element 1502e indicates the physical location of the communications interface of the AV 1304a (e.g., using an indicator line).

As another example, as shown in FIG. 15B, a graphical element 1502f can display information regarding the tires of the AV 1304a. For instance, the graphical element 1502f can display an air pressure of each of the tires of the AV 1304a (e.g., as obtained using a tire-pressure monitoring system (TPMS)). In some implementations, the graphical element 1502f can be displayed such that the graphical element 1502f appears to be positioned at or in proximity to the physical locations of the tires of the AV 1304a. In some implementations, the graphical element 1502f can be displayed such that the graphical element 1502f indicates the physical locations of the tires of the AV 1304a (e.g., using an indicator line).

As another example, as shown in FIG. 15B, a graphical element 1502g can display information regarding a battery system and/or a fuel system of the AV 1304a. For instance, the graphical element 1502g can display the total capacity of the battery system of the AV 1304a, and a remaining battery level of the battery system (e.g., as a percentage of the total capacity). As another example, the graphical element 1502g can display the total capacity of the fuel system of the AV 1304a, and a remaining fuel level of the battery system (e.g., as a percentage of the total capacity). In some implementations, the graphical element 1502g can be displayed such that the graphical element 1502g appears to be positioned at or in proximity to the physical location of the battery system and/or the fuel system of the AV 1304a. In some implementations, the graphical element 1502g can be displayed such that the graphical element 1502g indicates the physical location of the battery system and/or the fuel system of the AV 1304a (e.g., using an indicator line).

In some implementations, a GUI can display information regarding multiple AVs concurrently. Further, information regarding each of the AVs can be positioned in the GUI such that the information appears to be arranged spatially proximal to that AV. This can be useful, for example, as the GUI enables a user to determine which information corresponds to which AV in an intuitive manner.

For instance, in the example shown in FIG. 15B, two AVs 1304a and 1304b are positioned in the field of view 1412 of the user 1308. The augmented reality system 1302 can generate the GUI 1500 such that information regarding each of the AVs 1304a and 1304b are presented concurrently to the user. For example, the graphical element 1502a can present information regarding the processors of the AV 1304b, and the graphical elements 1502e-1502g can present information regarding the data transmission to and/or from the AV 1304a, the tires of the AV 1304a, and the battery system and/or fuel system of the AV 1304a. Further, each of the graphical elements 1502a and 1502e-1502g can be positioned in the GUI 1500 such that the graphical elements 1502a and 1502e-1502g appear to be arranged spatially proximal to respective AVs 1304a or 1304b (e.g., such that the user can readily ascertain which graphical element corresponds to which AV).

Figure 15C:
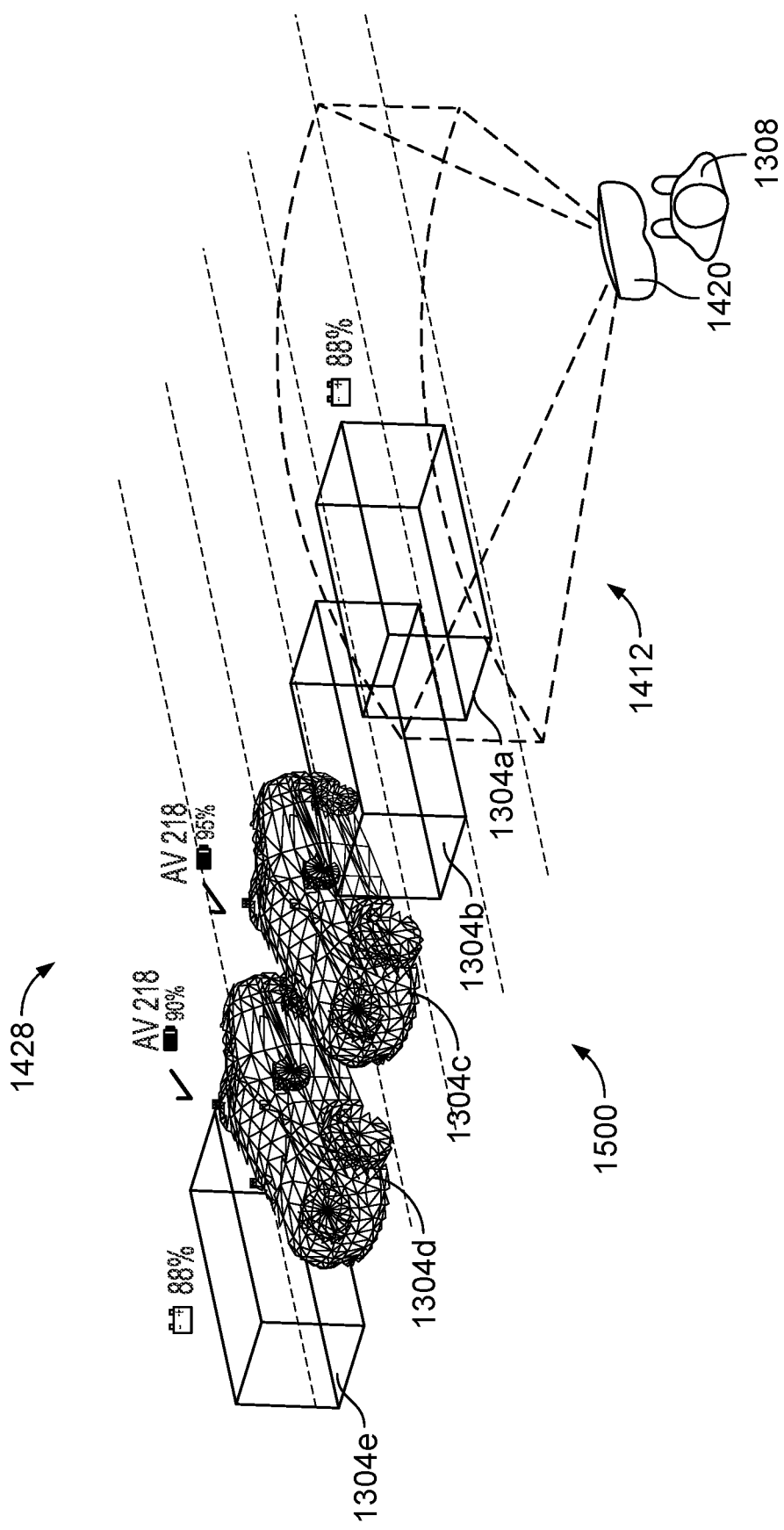

As another example, as shown in FIG. 15C, five AVs 1304a-1304e are positioned in the field of view 1412 of the user 1308. The augmented reality system 1302 can generate the GUI 1500 such that information regarding each of the AVs 1304a-1304e are presented concurrently to the user. For example, the graphical element 1502h can present information regarding the battery system and/or fuel system of one or more of the AVs 1304a-1304e.

In some implementations, a GUI can display information regarding each and every one of the AVs in the field of view of the user. In some implementations, a GUI can display information regarding a first subset of the AVs in the field of view of the user only. In some implementations, the subset of the AVs can be selected based on a distance between the AVs and the user (e.g., the GUI can display information regarding AVs within a particular threshold distance from the user, and refrain from display information regarding AVs beyond the threshold distance). In some implementations, the subset of the AVs can be selected based on an input from the user (e.g., an input specifying one or more AVs for which information should be presented to the user). In some implementations, the subset of the AVs can be selected by identifying the N AVs that are the closest to the user. N can be specified, for example, by the user or another user (e.g., an administrative user or developer).

In some implementations, a GUI can display notifications regarding one or more of the AVs 1304a-1304n. Notifications can include, for example, an indication that certain tasks were performed or are going to be performed by an AV, an indication of a condition (e.g., a "health") or status of an AV, an indication an error or malfunction associated with an AV, an indication of a command or request provided by a user to an AV and/or any other system described herein, and/or an indication of any information described herein.

Figure 16:
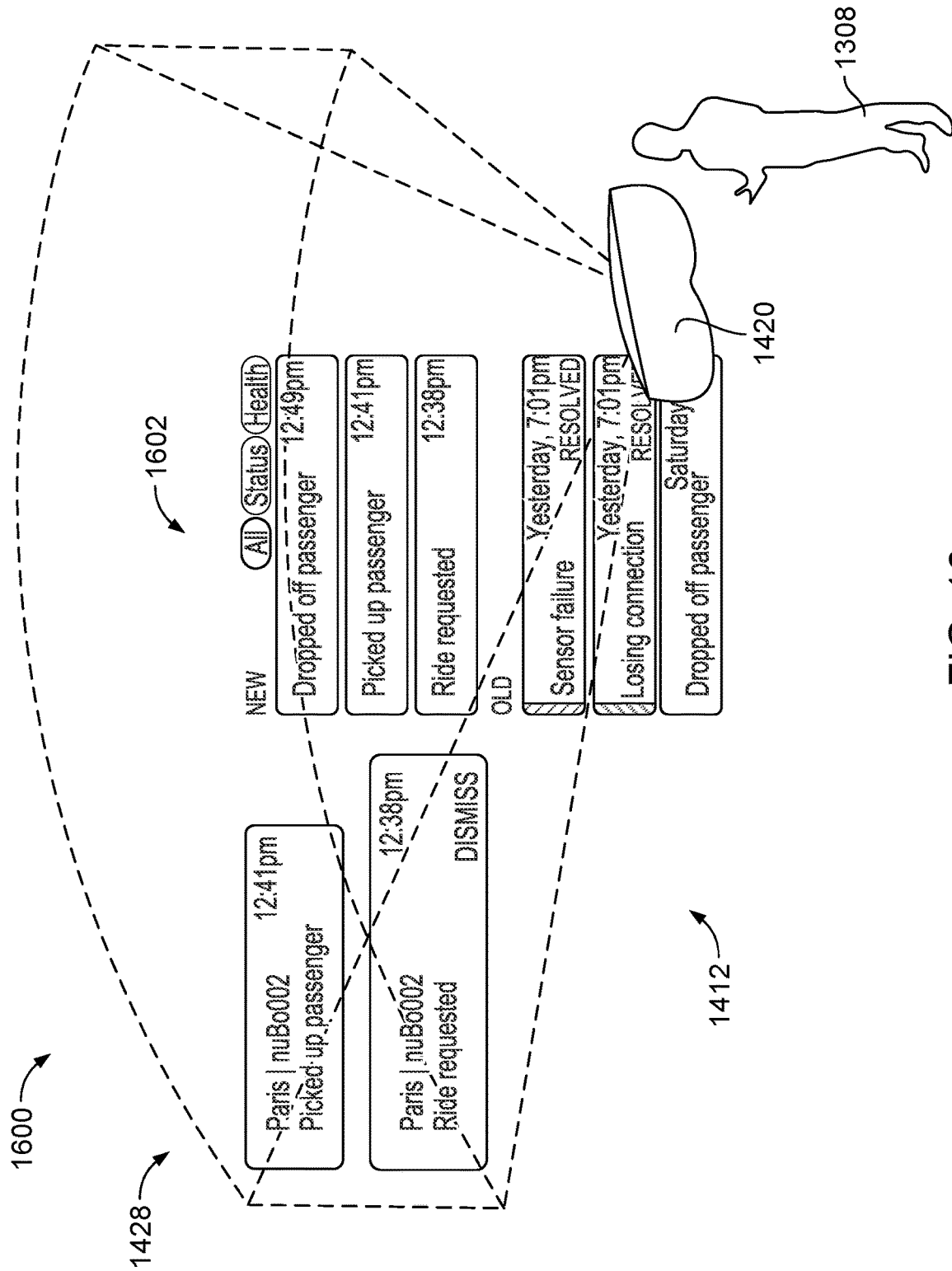
FIG. 16 shows another example GUI that can be presented by an augmented reality system.

In some implementation, at least some of the notifications can be displayed such that they appear in a field of view of the user. For example, FIG. 16 shows an example GUI 1600 presented by the augmented reality system 1302. In this example, a user 1308 wearing a headset 1420 of the augmented reality system 1302 perceives their physical environment 1428 and the GUI 1600 concurrently in their field of view 1412. Further, the GUI 1600 includes several graphical elements 1602 (e.g., patterns of icons, symbols, images, text, and/or colors) that appear to be positioned within the physical environment 1428 of the user, such that the graphical elements 1602 are hovering or floating in front of him. The graphical elements 1602 can include, for example, an indication that a particular user has requested a ride with an AV, an indication that a particular AV has picked up a passenger, and/or an indication that a particular AV has dropped off a passenger. As further examples, the graphical elements 1602 can include an indication that a particular component of a particular AV is experiencing an error or malfunction, and/or an indication of a status of the AV and/or one or more of its components.

In some implementations, the user 1308 can filter the graphical elements 1602, such that only a subset of the graphical elements 1602 are presented in their field of view 1412. As an example, the GUI 1600 can include a set of graphical elements 1602 pertaining to multiple different categories of information. The user 1308 can select one or more of those categories (e.g., such that information regarding those categories are presented in their view of view 1412), and refrain from selecting one or more other categories (e.g., such that the information regarding those categories are not presented in their view of view 1412).

In some implementations, the user 1308 can navigate through a GUI via an input device (e.g., an input device 1408). In some implementations, the user 1308 can navigate through a GUI by performing one or more gestures (e.g., gestures that are detected by the sensors 1406). As an example, a user can move their hand upward or downward to scroll through a list of elements on the GUI. As another example, a user can swipe their hand left or right to remove particular elements of the GUI from their field of view. As another example, a user can reach out and mimic touching a particular element of the GUI to select or activate that element.

The augmented reality system 1302 can be used in various use cases with respect to one or more AVs 1304a-1304n.

As an example, the augmented reality system 1302 can be used to facilitate the deployment one or more of AVs 1304a-1304n. This can include, for example, displaying information to a user and/or receiving commands from a user regarding readying an AV to transition from an idle state (e.g., in which the AV is held in a depot for storage or maintenance) to an operational or active state (e.g., in which the AV is traversing to a location, picking up passengers or cargo, transporting passengers or cargo, etc.). This can also include, for example, displaying information to a user and/or receiving commands from a user regarding starting up or activating an AV, calibrating one or more components of the AV (e.g., one or more sensors), and validating the calibration of those components. In some limitations, the augmented reality system 1302 can indicate that particular components have been activated, calibrated, and/or validated (e.g., by displaying a "check" indicator alongside a component if it has been activated, calibrated, and/or validated, or a "cross" indicator alongside an component if it has not).

As another example, the augmented reality system 1302 can be used to facilitate the maintenance and repair of one or more of AVs 1304a-1304n. This can include, for example, displaying information to a user and/or receiving commands from a user regarding an error or malfunction of one or more components of an AV, and steps or procedures for correcting the error or malfunction. This can also include, for example, displaying information to a user and/or receiving commands from a user regarding routine or preventative maintenance (e.g., prior to an AV experiencing an error or malfunction). This can also include, for example, displaying information to a user and/or receiving commands from a user regarding refueling or recharging an AV.

As another example, the augmented reality system 1302 can be used to facilitate the organization and management of one or more of AVs 1304a-1304n. This can include, for example, displaying information to a user and/or receiving commands from a user regarding a division of AVs into different logical groups or logical subgroups (e.g., fleets or sub-fleets), the scheduling of AVs for deployment and/or storage, the scheduling of AVs to perform particular tasks, the allocation of AVs to particular locations or regions, and the redistribution of AVs between different locations or regions.

Figure 17A:
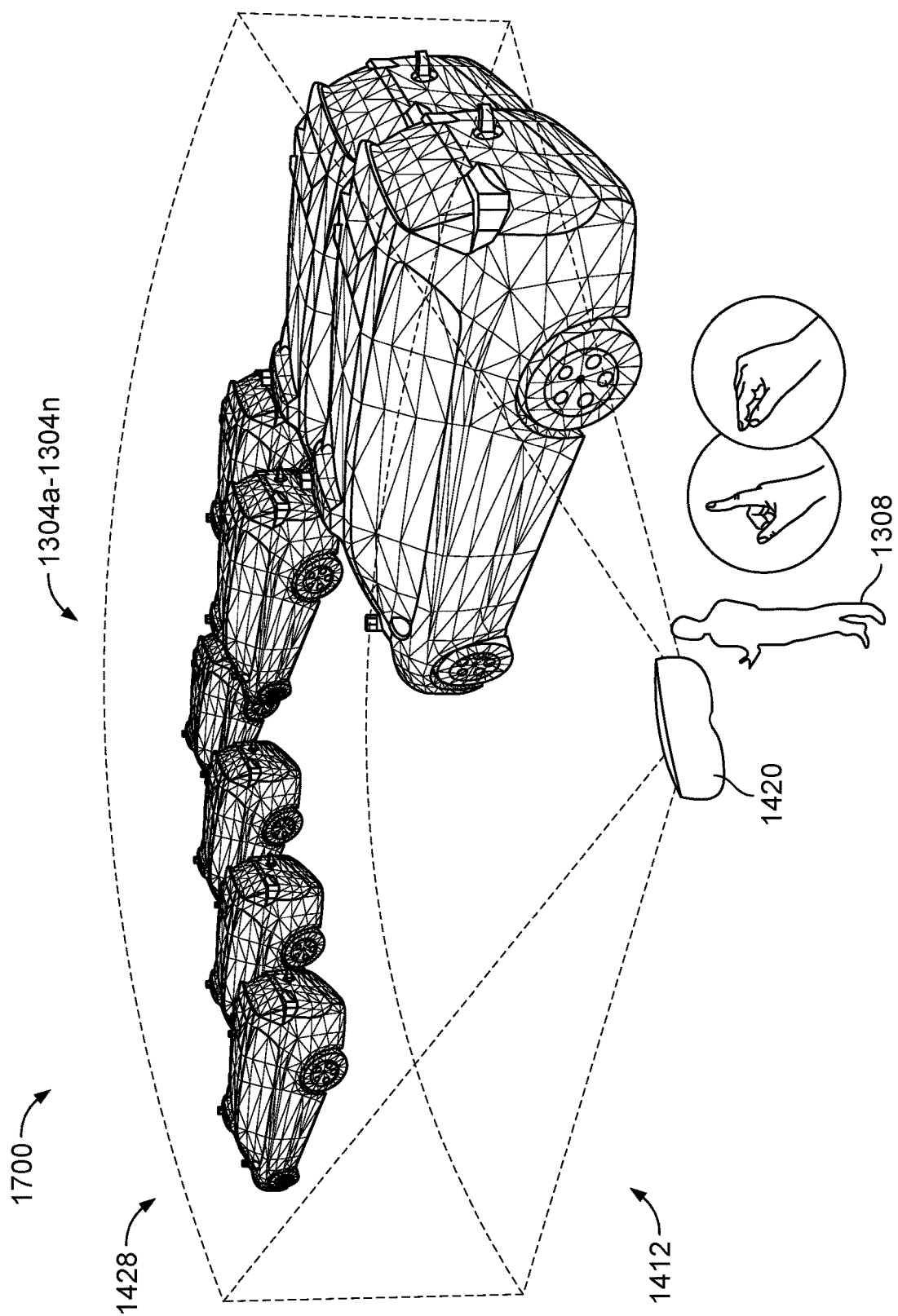
FIGS. 17A and 17B show an example use case of an augmented reality system.
Figure 17B:
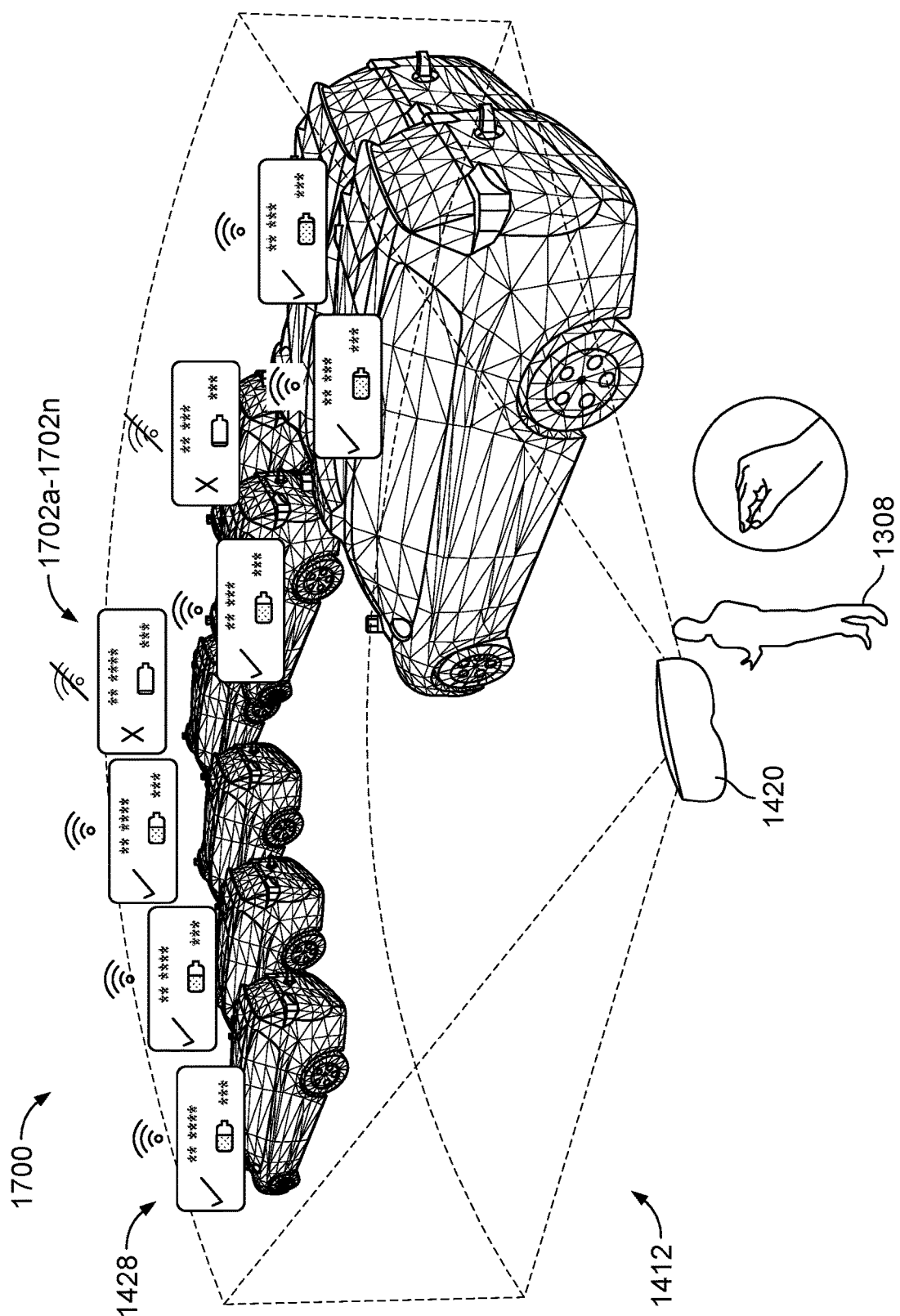

FIGS. 17A and 17B show an example use case of the augmented reality system 1302 to facilitate the deployment of AVs from a depot.

FIG. 17A shows an example GUI 1700 that is presented by the augmented reality system 1302. In this example, a user 1308 wearing a headset 1420 of the augmented reality system 1302 perceives their physical environment 1428 (e.g., including several AV 1304a-1304n) and the GUI 1700 concurrently in their field of view 1412.

As a user 1308 approaches one or more of the AVs 1304a-1304n, the augmented reality system 1302 updates the GUI 1700 to show information regarding AVs 1304a-1304n that are in proximity to the user 1308 (e.g., within a particular threshold distance from the user). For example, as shown in FIG. 17B, the augmented reality system 1302 can update the GUI 1700 to include respective graphical elements 1702a-1702n (e.g., patterns of icons, symbols, images, text, and/or colors) for the AVs 1304a-1304n. Each of the graphical elements 1702a-1702n can display information relevant to deploying a respective one of the AVs 1304a-1304n. For example, each of the graphical elements 1702a-1702n can display an indication of whether a particular AV is communicatively coupled to a network (e.g., one or more of the networks 322, 328, or 1306), an indication of a remaining battery level of the battery system of the AV (e.g., as a percentage of the total capacity), an indication of whether the AV has passed pre-deployment inspections (e.g., a check mark can indicate that the AV has passed the inspections, and an "X" can indicate that the AV has not passed the inspections), and/or the like. Further, each of the graphical elements 1702a-1702n can be positioned in the GUI 1700 such that the graphical elements 1702a-1702n appear to be arranged spatially proximal to its respective AV (e.g., hovering or floating near that AV).

Further, the user 1308 can interact with the augmented reality system 1302 to issue one or more commands with respect to the AVs 1304a-1304n. For example, as discussed above, the augmented reality system 1302 can include one or more input devices 1408 for receiving input from the user 1308. Inputs received by the input devices 1408 can be provided to the one or more computer systems 1402 for interpretation. For example, the one or more computer systems 1402 can identify one or more commands associated with the inputs, and transmit the commands to one or more of the AV 1304a-1304n for execution. As another example, a user 1308 can move one or more portions of their body to perform a physical gesture. The augmented reality system 1302 can detect the gesture (e.g., using one or more of the sensors 1406), determine one or more commands associated with the gesture, and transmit the commands to one or more of the AV 1304a-1304n for execution.

Figure 18A:
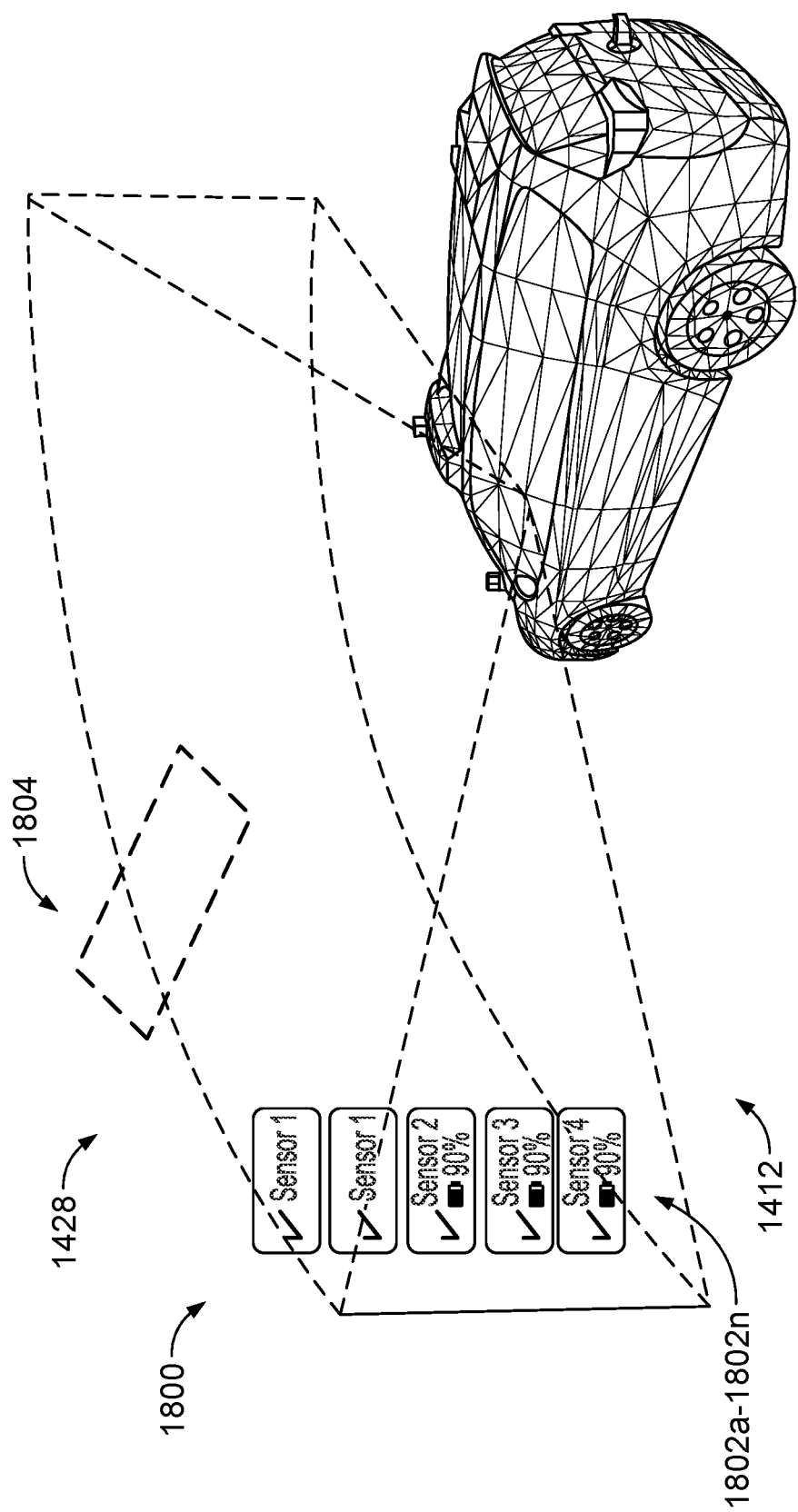
FIGS. 18A and 18B show another example use case of an augmented reality system.
Figure 18B:
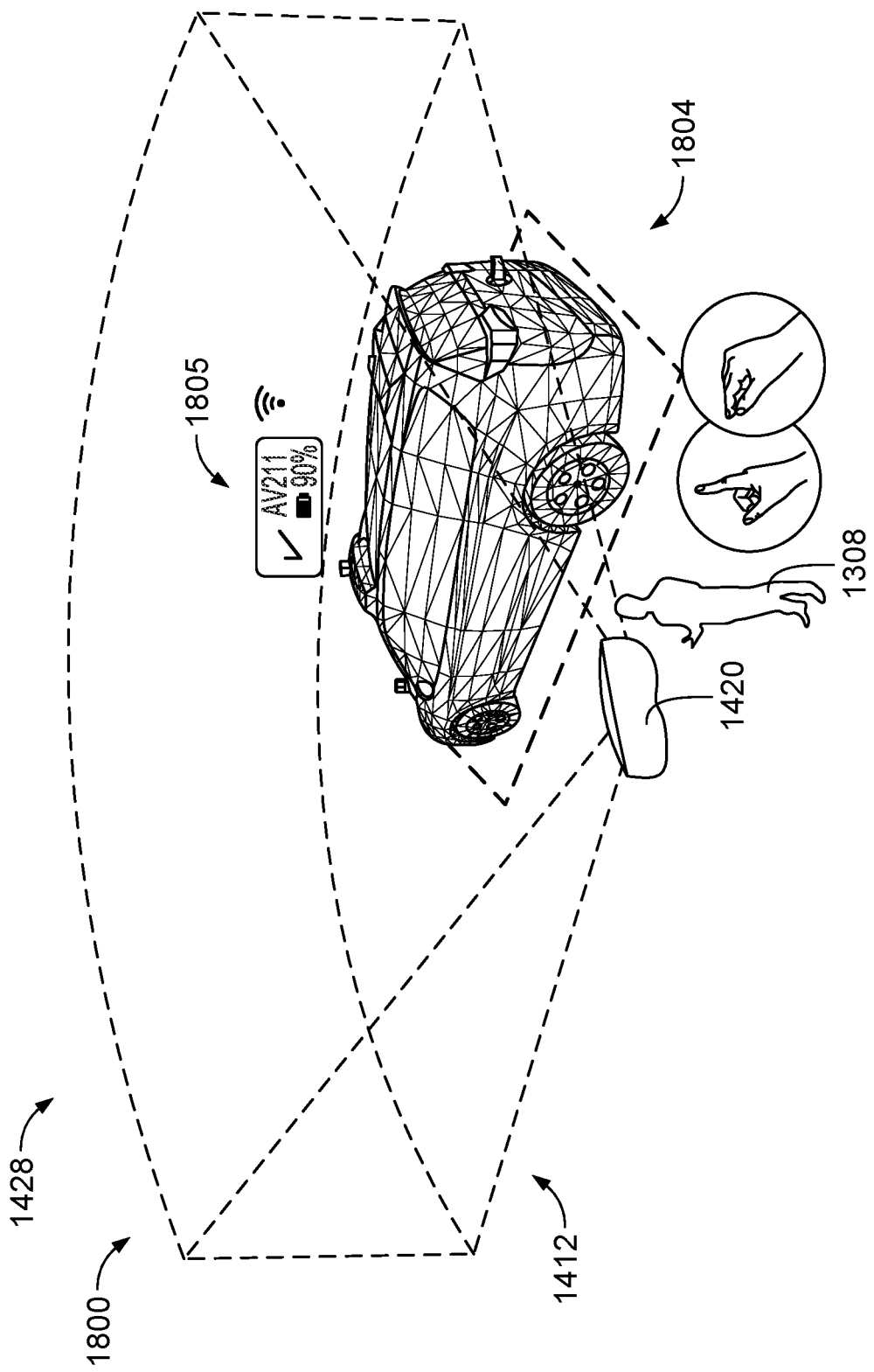

FIGS. 18A and 18B shows another example use case of the augmented reality system 1302 to facilitate the calibration of sensors on an AV 1304a.

FIG. 18A shows an example GUI 1800 that is presented by the augmented reality system 1302. In this example, a user 1308 wearing a headset 1420 of the augmented reality system 1302 is seated in the AV 1304a, and perceives their physical environment 1428 and the GUI 1800 concurrently in their field of view 1412.

In some implementations, the user 1308 can manually instruct the AV 1304a to calibrate one or more of its sensors. In some implementations, the AV 1304a can automatically initiate a calibration of one or more of its sensors. During the calibration process, the augmented reality system 1302 updates the GUI 1800 to show information regarding the sensors of the AV 1304a. For example, as shown in FIG. 18A, the augmented reality system 1302 can update the GUI 1800 to include graphical element 1802a-1802n (e.g., patterns of icons, symbols, images, text, and/or colors) for the sensors that are being calibrated.

Each of the graphical elements 1802a-1802n can display information relevant to a particular sensor (or groups of sensors). For example, each of the graphical elements 1802a-1802n can display an indication (e.g., a check mark can indicate that the sensor has completed the calibration process, and an "X" can indicate that the sensor has not yet completed the calibration process) of whether the sensor has completed a calibration process. As another example, if a particular sensor is battery powered, the corresponding graphical element 1802*a*-1802*n* can include in indication of a remaining battery level of the battery (e.g., as a percentage of the total capacity).

Further, the augmented reality system can update the GUI 1800 to indicate an assigned staging location for an AV 1304*a*. For example, as shown in FIG. 18A, the augmented reality system can update the GUI 1800 to include a graphical element 1804 indicating a staging location (e.g., a location at which the AV 1304*a* can be positioned in preparation for deployment into the field). In some implementations, the graphical element 1804*a* can be positioned such that the graphical element 1804*a* appears to outline a particular area on the ground (e.g., mimicking boundary lines that have been painted onto the ground). While hearing the headset 1420, the user 1308 can manually guide the AV 1304*a* to the indicated location and exit the vehicle. In some implementations, the AV 1304*a* can automatically guide itself to the indicated location, and indicate to the user 1308 (e.g., using the headset 1420) that it is safe to exit the AV 1304*a*.

In some embodiments, the augmented reality system 1302 can update the GUI depending on whether the user is inside or outside of an AV. For example, the augmented reality system 1302 can detect when the user 1308 is inside of the AV 1304*a* (e.g., using the sensors 1406), and in response, display a first view of the GUI 1800 (e.g., the GUI 1800 shown in FIG. 18A). As another example, the augmented reality system 1302 can detect when the user 1308 has exited the AV 1304*a* (e.g., using the sensors 1406), and in response, display a second view of the GUI 1800 (e.g., the GUI 1800 shown in FIG. 18B).

As shown in FIG. 18B, when the user has exited the AV 1304*a*, the augmented reality system 1302 can update the GUI 1800 such that the GUI 1800 shows a graphical element 1806 (e.g., patterns of icons, symbols, images, text, and/or colors) that represent information regarding the AV 1304*a*. The graphical element 1806 can display information relevant to deploying the AV 1304*a*. For example, the graphical element 1806 can display an indication of whether the AV 1304*a* is communicatively coupled to a network (e.g., one or more of the networks 322, 328, or 1306), an indication of a remaining battery level of the battery system of the AV 1304*a* (e.g., as a percentage of the total capacity), an indication of whether the AV 1304*a* has passed pre-deployment inspections (e.g., a check mark can indicate that the AV has passed the inspections, and an "X" can indicate that the AV has not passed the inspections), and/or the like. Further, the graphical element 1806 can be positioned in the GUI 1800 such that the graphical element 1806 appears to be arranged spatially proximal to the AV 1304*a* (e.g., hovering or floating near the AV 1304*a*).

Further, the user 1308 can interact with the augmented reality system 1302 to issue one or more commands with respect to the AV 1304*a*. For example, as discussed above, the augmented reality system 1302 can include one or more input devices 1408 for receiving input from the user 1308. Inputs received by the input devices 1408 can be provided to the one or more computer systems 1402 for interpretation. For example, the one or more computer systems 1402 can identify one or more commands associated with the inputs, and transmit the commands the AV 1304*a* for execution. As another example, a user 1308 can move one or more portions of their body to perform a physical gesture. The augmented reality system 1302 can detect the gesture (e.g., using one or more of the sensors 1406), determine one or more commands associated with the gesture, and transmit the commands to the AV 1304*a* for execution. Example commands include a command to transition the autonomous vehicle from an idle state to an active state, a command to assign a task to the autonomous vehicle for execution, a command to assign a geographical region to the autonomous vehicle for operation, a command to refuel or recharge the autonomous vehicle, a command to calibrate a component of the autonomous vehicle, a command to perform a maintenance process for the autonomous vehicle, and/or a command to assign the autonomous vehicle to a logical group among a plurality of logical groups. In some implementations, a command can include instructions to perform any of the operations described herein.

Figure 19A:
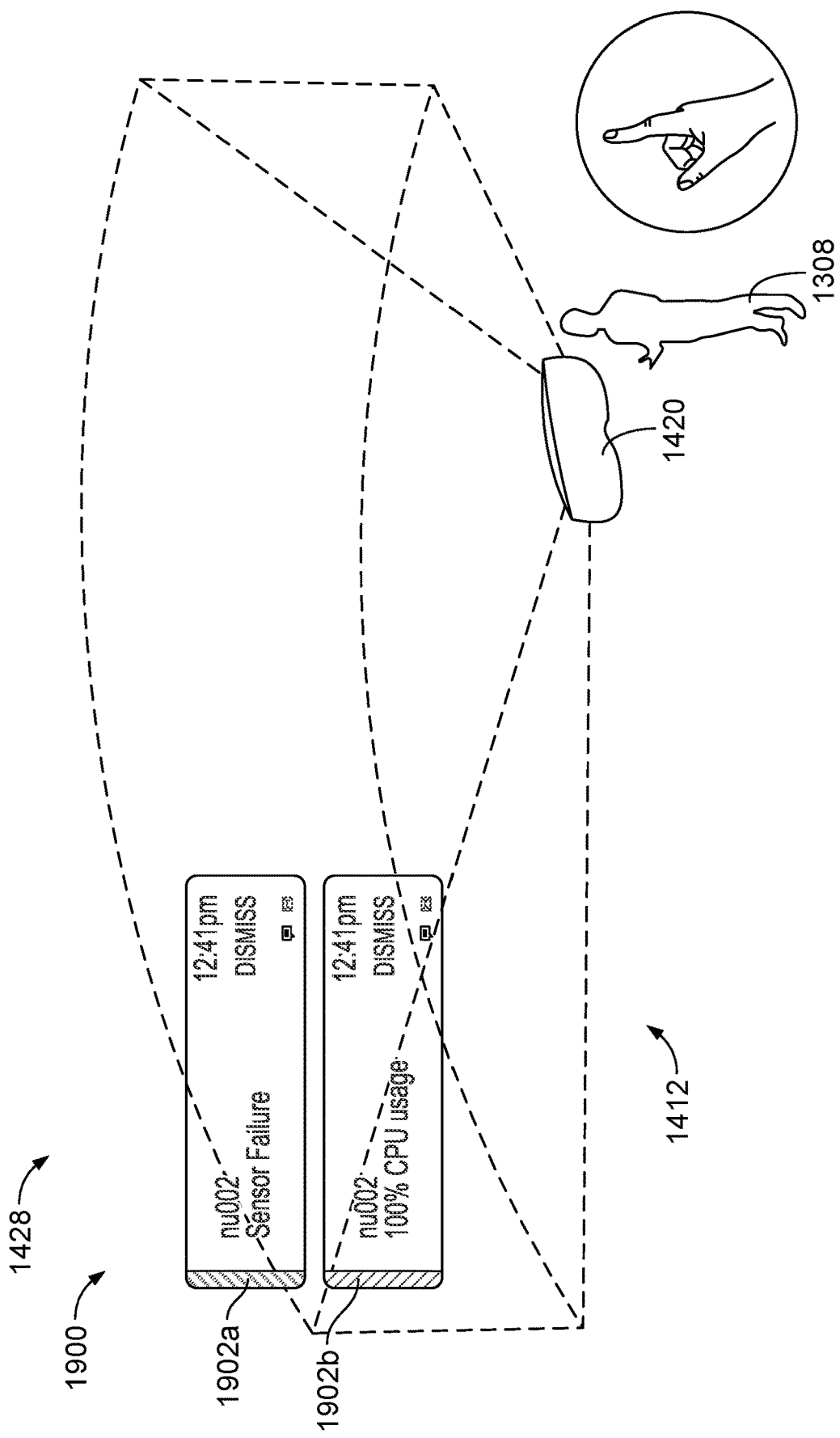
FIGS. 19A-19C show another example use case of an augmented reality system.
Figure 19B:
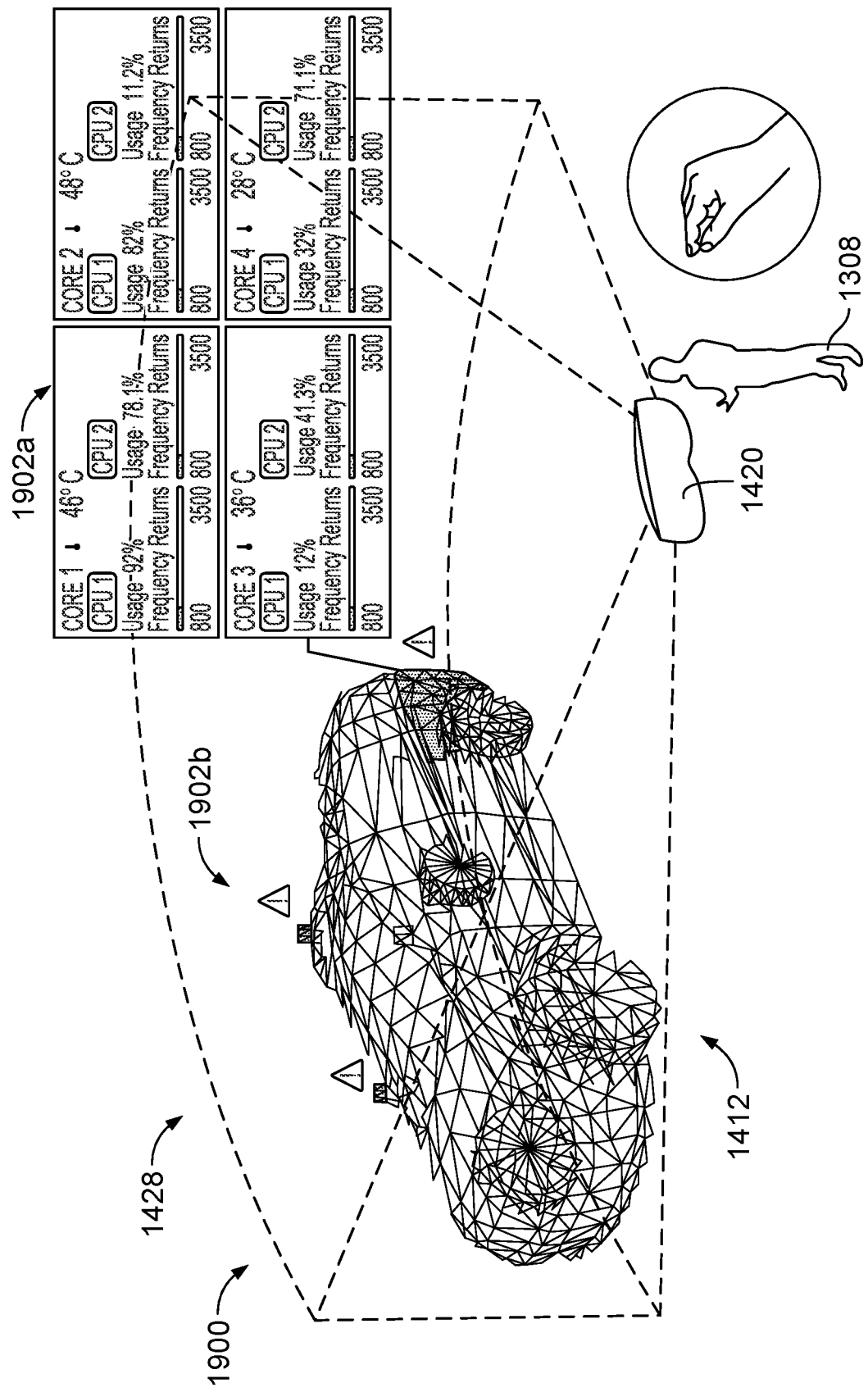
Figure 19C:
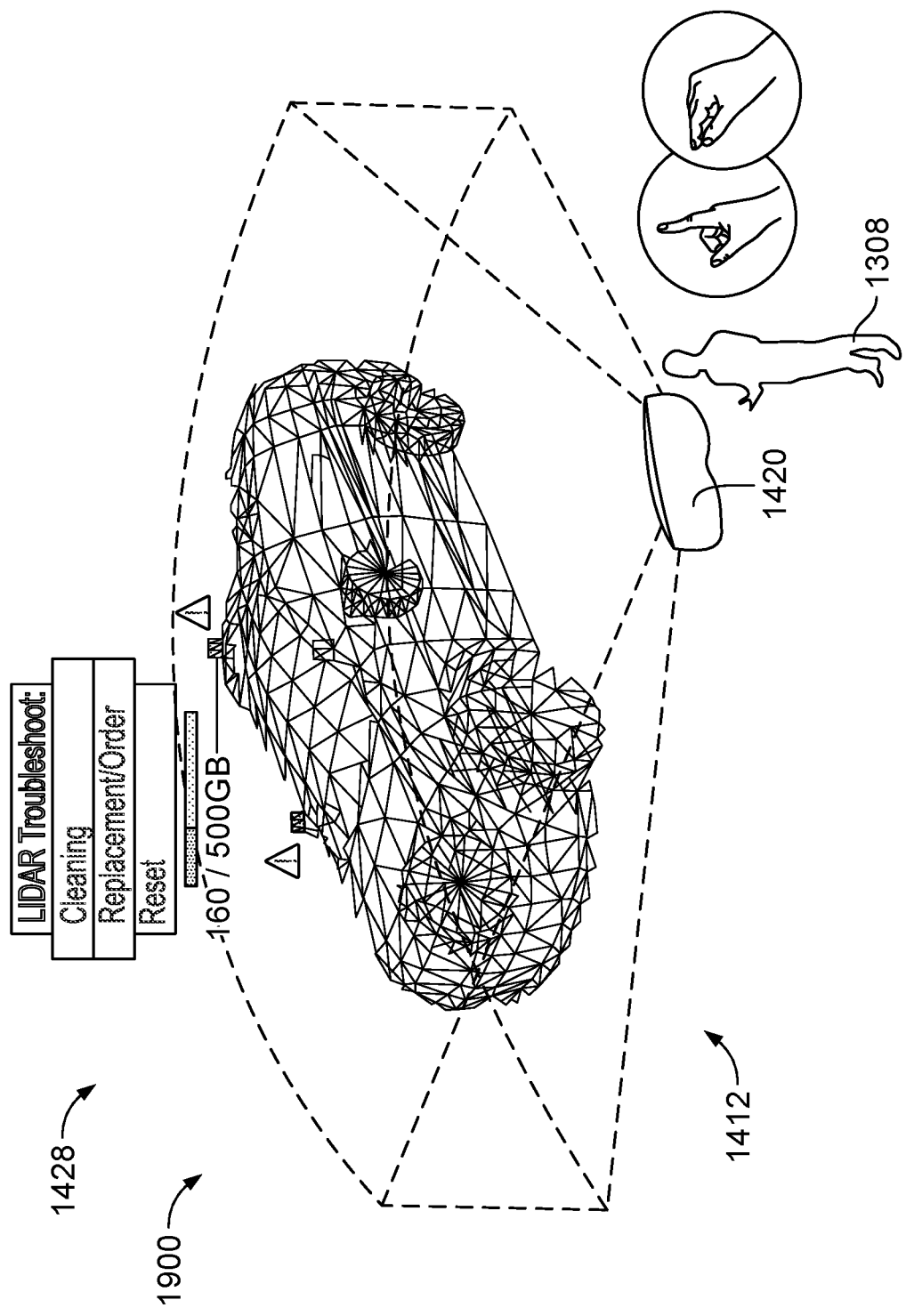

FIGS. 19A-19C show another example use case of the augmented reality system 1302 to facilitate the deployment of AVs from a depot.

FIG. 19A shows an example GUI 1900 that is presented by the augmented reality system 1302. In this example, a user 1308 wearing a headset 1420 of the augmented reality system 1302 perceives their physical environment 1428 and the GUI 1900 concurrently in their field of view 1412.

As described above, the augmented reality system 1302 can update the GUI 1900 to display notifications regarding one or more of the AVs 1304*a*-1304*n*. For example, as shown in FIG. 19A, the augmented reality system 1302 can update the GUI 1900 to include a graphical element 1902*a* indicating that a particular sensor of the AV 1304*a* is experiencing an error or malfunction, and a graphical element 1902*b* indicating that a particular processor of the AV 1304*a* is experiencing abnormally high usage. The graphical elements 1920*a* and 1902*b* can also indicate the identity of the AV 1304*a* (e.g., an identifier, serial number, or name of the AV 1304*a*). Further, the graphical elements 1920*a* and 1902*b* can also indicate the time at which the notification was generated, options to forward the notification to others (e.g., via text message, chat message, email, etc.), and an option to dismiss the notification.

Based on the information, the user 1308 can locate and approach the AV 1304*a* identified in the notifications. As the user 1308 approaches the AV 1304*a*, the augmented reality system 1302 can update the GUI 1900 to display information regarding the AV 1304*a*. For example, as shown in FIG. 19B, the augmented reality system 1302 can update the GUI 1900 to include graphical elements 1904 that present additional information regarding each of the components of the AV 1304*a* that are experiencing an error or malfunction. For example, the GUI 1900 can be updated to include a graphical element 1904*a* that displays information regarding one or more processors of the AV 1304*a* (e.g., a temperature of the processors, a usage or utilization percentage of the processors, a frequency or clock speed of the processors, etc.). As another example, the GUI 1900 can be updated to include a graphical elements 1904*b* indicating that certain sensors are experiencing an error or malfunction. In some implementations, the component of the AV 1304*a* that is experiencing a malfunction can be visually emphasized or highlighted (e.g., using a different color, a different brightness, a different size, and/or a distinctive icon), such that the user 1308 can readily identify the component.

Further, the user 1308 can interact with the augmented reality system 1302 to issue one or more commands with respect to the AV 1304*a*. For example, as shown in FIG. 19C, the user 1308 can select one of the components of the AV 1304*a* (e.g., using an input device 1408 and/or performing a physical gesture, such as reaching towards the component or pointing to the component). In response, the augmented reality system 1302 can update the GUI 1900 to display a list of options 1906 that can be performed with respect to the selected component. As an example, if the component is a LIDAR sensor, the list of options 1906 can include cleaning the sensor, replacing the sensor (or ordering a replacement sensor), and resetting the sensor. The user can select one of the options (e.g., using an input device 1408 and/or performing a physical gesture, such as reaching towards the option or pointing to the option). In response, the augmented reality system 1302 can instruct the AV 1304*a* to perform the selected option (e.g., if the selected option can be performed by the AV 1304*a*), and/or transmit a request to another system or user to perform the selected option (e.g., if the selected option is to be performed by another system and/or by another user).

If the errors or malfunctions are resolved, the augmented reality system 1302 can update the GUI 1900 accordingly.

Although example use cases are described herein, there are merely illustrative examples. In practice, the augmented reality system 1302 can be used to display any information regarding the operation of one or more AVs, and/or enable a user to interact with one or more AVs in any manner.

Example Processes

Figure 20:
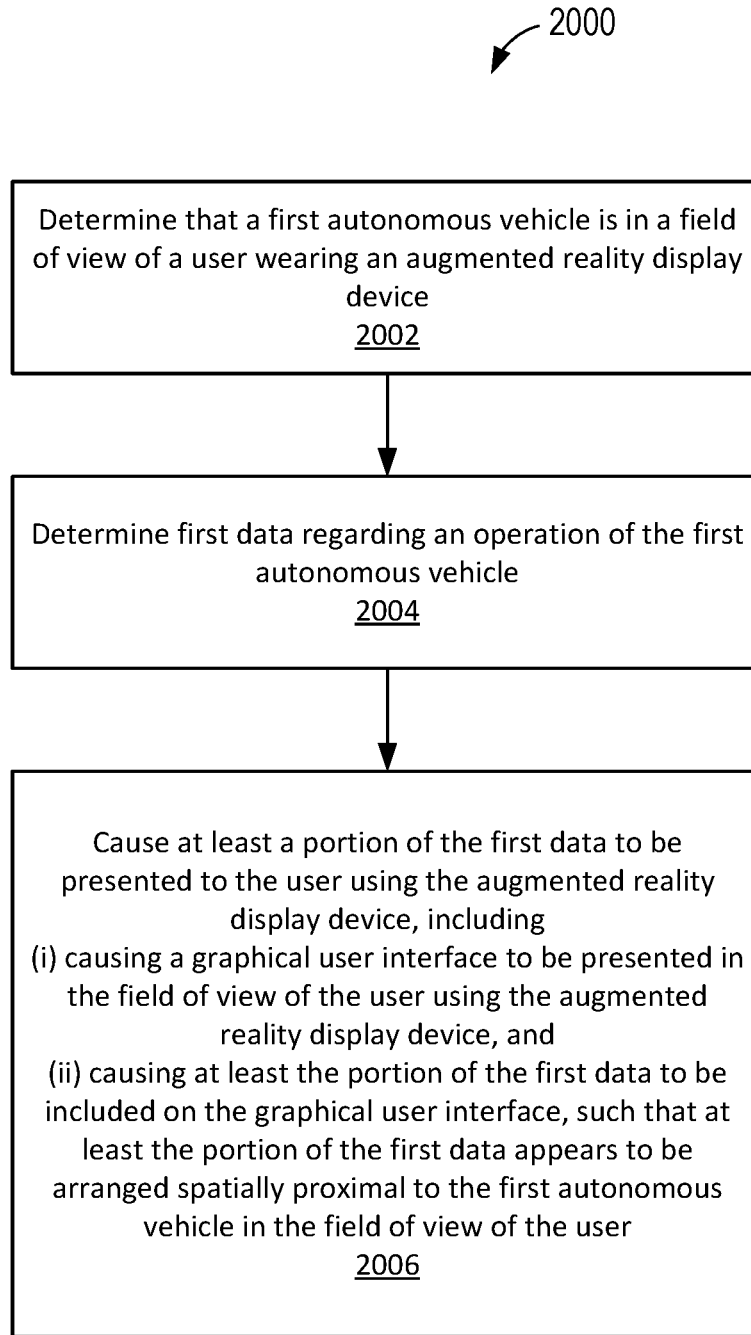
FIG. 20 shows a flow diagram of an example process for monitoring and controlling an operation of one or more AVs.

FIG. 20 shows an example process 2000 for monitoring and controlling an operation of one or more AVs. The process 2000 can be performed, at least in part, using one or more of the systems shown in FIGS. 1-12 (e.g., in accordance with the techniques described with respect to FIGS. 13-19). As an example, the process 2000 can be performed, at least in part, using the augmented reality system 1302 (e.g., as shown in FIGS. 13, 14A, and 14B) one or more of the processors 304 (e.g., as shown in FIG. 3).

According to the process 2000, at least one processor determines that a first autonomous vehicle is in a field of view of a user wearing an augmented reality display device (block 2002). As an example, the at least one processor can determine that one of the AVs 1304*a*-1304*n* (e.g., as shown in FIG. 13) is in a field of view of a user wearing an augmented reality display device 104 (e.g., as shown in FIGS. 14A and 14B).

The at least one processor determines first data regarding an operation of the first autonomous vehicle (block 2004). The first data can include at least some of the information described herein.

For example, in some implementations, the first data can include information regarding a deployment status of the first autonomous vehicle. This information can include, for example, an indication that the first autonomous vehicle is in an idle state or an active state, an indication of a task assigned to the first autonomous vehicle for execution, an indication of a geographical region assigned to the first autonomous vehicle for operation, an indication of a route assigned to the first autonomous vehicle for traversal, an indication of one or more routes previously traversed by the first autonomous vehicle, an indication of one or more prior locations of the first autonomous vehicle, an indication of a condition or status of the first autonomous vehicle, or an indication of an alert or notification regarding the first autonomous vehicle.

As another example, in some implementations, the first data can include information regarding a maintenance or repair status of the first autonomous vehicle. This information can include, for example, an indication of a malfunction of a component of the autonomous vehicle, an indication of a fuel level of the autonomous vehicle, an indication of a battery level of the autonomous vehicle, an indication of a calibration of a component of the autonomous vehicle, an indication of damage to the autonomous vehicle, indication of a cleaning status of the autonomous vehicle, an indication of maintenance to be performed on the first autonomous vehicle, an indication of a mileage or fuel efficiency of the first autonomous vehicle, an indication of a component of the first autonomous vehicle to be inspected for malfunction, or an indication of a maintenance or repair history of the first autonomous vehicle.

As another example, in some implementations, the first data can include information regarding an organizational status of the first autonomous vehicle. This information can include, for example, an indication that the first autonomous vehicle is assigned to a first logical group among a plurality of logical groups, and/or an indication that a first operator has been assigned to the first autonomous vehicle.

The at least one processor causes at least a portion of the first data to be presented to the user using the augmented reality display device (block 2006). Causing at least the portion of the first data to the presented to the user includes causing a graphical user interface to be presented in the field of view of the user using the augmented reality display device, and causing at least the portion of the first data to be included on the graphical user interface, such that at least the portion of the first data appears to be arranged spatially proximal to the first autonomous vehicle in the field of view of the user.

In some implementations, causing at least the portion of the first data to the presented to the user can include determining that the field of view of the user has been altered, and in response, modifying the graphical user interface such that at least the first portion of the first data appears to be arranged spatially proximal to the first autonomous vehicle in the altered field of view of the user. In some implementations, the at least one processing by continuously determine whether the field of view of the user has been altered, and if so, modify the graphical user interface in response.

In some implementations, information can be presented regarding multiple autonomous vehicles concurrently. For example, the at least one processor can determine that a plurality of second autonomous vehicle is in the field of view of the user concurrently, determine second data regarding an operation of each of the second autonomous vehicles, and cause at least a portion of the second data to be presented to the user using the augmented reality display device. Causing at least the portion of the second data to the presented to the user can include causing the graphical user interface to be presented in the field of view of the user using the augmented reality display device, and causing at least the portion of the second data to be included on the graphical user interface, such that at least the second portion of the first data appears to be arranged spatially proximal to each of the second autonomous vehicles in the field of view of the user In some implementations, the at least one processor can determine that a user performed a physical gesture with respect to the graphical user interface. Further, the at least one processor can determine that the physical gesture is associated with a command, and causing the command to be executed with respect to the first autonomous vehicle. In some implementations, the physical gesture can include a movement of at least one of an arm of the user or a hand of the user.

In the foregoing description, several embodiments have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   determining, by at least one processor, that a plurality of autonomous vehicles (i) are concurrently in a field of view of a user wearing an augmented reality display device and (ii) are in an idle state in a depot for at least one of storage or maintenance;
   determining, by the at least one processor, first data regarding an operation of each of the first autonomous vehicles, the first data indicating:
      a maintenance or repair status of each of the autonomous vehicles, and
      a deployment status of each of the autonomous vehicles, wherein the deployment status of each of the autonomous vehicles comprises an indication of one or more routes previously traversed by that autonomous vehicle including:
         a starting spatiotemporal location representing a pick up location for a respective passenger by that autonomous vehicle, and
         a final spatiotemporal location representing a drop off location for the respective passenger by that autonomous vehicle; and
   upon determining that the plurality of autonomous vehicles are concurrently in the field of view of the user and are in the idle state, causing, by the at least one processor, at least a portion of the first data to be presented to the user using the augmented reality display device, wherein causing at least the portion of the first data to the presented to the user comprises:
      causing a graphical user interface to be presented in the field of view of the user using the augmented reality display device, and
      causing at least the portion of the first data, including the indication of the one or more routes, to be included on the graphical user interface, such that at least the portion of the first data appears to be arranged spatially proximal to each of the first autonomous vehicles in the field of view of the user.

2. The method of claim 1, wherein causing at least the portion of the first data to the presented to the user comprises:
   determining that the field of view of the user has been altered, and
   responsive to determining that the field of view of the user has been altered, modifying the graphical user interface such that at least the first portion of the first data appears to be arranged spatially proximal to each of the autonomous vehicles in the altered field of view of the user.

3. The method of claim 2, wherein determining that the field of view of the user has been altered and modifying the graphical user interface is performed continuously.

4. The method of claim 1, further comprising:
   determining, by the at least one processor, that one or more additional autonomous vehicles are in the field of view of the user concurrently;
   determining, by the at least one processor, second data regarding an operation of each of the one or more additional autonomous vehicles; and
   causing, by the at least one processor, at least a portion of the second data to be presented to the user using the augmented reality display device, wherein causing at least the portion of the second data to the presented to the user comprises:
      causing the graphical user interface to be presented in the field of view of the user using the augmented reality display device, and
      causing at least the portion of the second data to be included on the graphical user interface, such that at least the second portion of the first data appears to be arranged spatially proximal to each of the one or more additional autonomous vehicles in the field of view of the user.

5. The method of claim 1, wherein the deployment status of each of the first autonomous vehicles further comprises at least one of:
   an indication of a task assigned to at least one of the autonomous vehicles for execution,
   an indication of a geographical region assigned to at least one of the autonomous vehicles for operation,
   an indication of a route assigned to at least one of the autonomous vehicles for traversal,
   an indication of one or more prior locations of at least one of the autonomous vehicles, and
   an indication of a condition or status of at least one of the autonomous vehicles, or
   an indication of an alert or notification regarding at least one of the autonomous vehicles.

6. The method of claim 1, the maintenance or repair status of each of the autonomous vehicles comprises at least one of:
   an indication of a malfunction of a component of at least one of the autonomous vehicles,
   an indication of a fuel level of at least one of the autonomous vehicles,
   an indication of a battery level of at least one of the autonomous vehicles,
   an indication of a calibration of a component of at least one of the autonomous vehicles,
   an indication of damage to at least one of the autonomous vehicles,
   an indication of a cleaning status of at least one of the autonomous vehicles,
   an indication of maintenance to be performed on at least one of the autonomous vehicles,
   an indication of a mileage or fuel efficiency of at least one of the autonomous vehicles,
   an indication of a component of at least one of the autonomous vehicles to be inspected for malfunction, or
   an indication of a maintenance or repair history of at least one of the autonomous vehicles.

7. The method of claim 1, wherein the first data comprises:
   information regarding an organizational status of each of the autonomous vehicles.

8. The method of claim 7, wherein the information regarding the organizational status of each of the autonomous vehicles comprises:

an indication that at least one of the autonomous vehicles is assigned to a first logical group among a plurality of logical groups, or an indication that a first operator has been assigned to at least one of the autonomous vehicles.

9. The method of claim 1, further comprising:

determining, by the at least one processor, that a user performed a physical gesture with respect to the graphical user interface, determining, by the at least one processor that the physical gesture is associated with a command, and causing, by the least one processor, the command to be executed with respect to at least one of the autonomous vehicles.

10. The method of claim 9, wherein the physical gesture comprises a movement of at least one of an arm of the user or a hand of the user.

11. The method of claim 9, wherein the command comprises at least one of:

a command to transition at least one of the autonomous vehicles from an idle state to an active state, a command to assign a task to at least one of the autonomous vehicles for execution, a command to assign a geographical region to at least one of the autonomous vehicles for operation, a command to refuel or recharge at least one of the autonomous vehicles, a command to calibrate a component of at least one of the autonomous vehicles, a command to perform a maintenance process for at least one of the autonomous vehicles, or a command to assign at least one of the autonomous vehicles to a logical group among a plurality of logical groups.

12. A system comprising:

an augmented reality display device;

at least one processor; and at least one non-transitory computer readable medium storing instructions that, when executed by the at least one processor, cause the at least one processor to perform operations comprising:

determining, by the at least one processor, that a plurality of autonomous vehicles (i) are in a field of view of a user wearing the augmented reality display device and (ii) are in an idle state in a depot for at least one of storage or maintenance;

determining, by the at least one processor, first data regarding an operation of each of the autonomous vehicles, the first data indicating:

a maintenance or repair status of each of the autonomous vehicles, and a deployment status of each of the autonomous vehicles, wherein the deployment status of the autonomous vehicle comprises an indication of one or more routes previously traversed by that autonomous vehicle including:

a starting spatiotemporal location representing a pick up location for a respective passenger by that autonomous vehicle, and a final spatiotemporal location representing a drop off location for the respective passenger by that autonomous vehicle; and upon determining that the plurality of autonomous vehicles are concurrently in the field of view of the user and are in the idle state, causing, by the at least one processor, at least a portion of the first data, including the indication of the one or more routes, to be presented to the user using the augmented reality display device, wherein causing at least the portion of the first data to the presented to the user comprises:

causing a graphical user interface to be presented in the field of view of the user using the augmented reality display device, and causing at least the portion of the first data to be included on the graphical user interface, such that at least the portion of the first data appears to be arranged spatially proximal to each of the autonomous vehicles in the field of view of the user.

13. A method comprising:

determining, by at least one processor, that a first autonomous vehicle (i) in a field of view of a user wearing an augmented reality display device and (ii) is in an idle state in a depot for at least one of storage or maintenance;

determining, by the at least one processor, first data regarding an operation of the first autonomous vehicle, the first data indicating:

an error or a malfunction of a component of the first autonomous vehicle, and a deployment status of each of the first autonomous vehicle, wherein the deployment status of the first autonomous vehicle comprises an indication of one or more routes previously traversed by that first autonomous vehicle including:

a starting spatiotemporal location representing a pick up location for a respective passenger by the first autonomous vehicle, and a final spatiotemporal location representing a drop off location for the respective passenger by the first autonomous vehicle; and upon determining that the first autonomous vehicle is in the field of view of the user and is in the idle state, causing, by the at least one processor, at least a portion of the first data, including the indication of the one or more routes, to be presented to the user using the augmented reality display device, wherein causing at least the portion of the first data to the presented to the user comprises:

causing a graphical user interface to be presented in the field of view of the user using the augmented reality display device, and causing at least the portion of the first data to be included on the graphical user interface, such that at least the portion of the first data appears to be arranged spatially proximal to the first autonomous vehicle in the field of view of the user, and such that the component is visually emphasized in the graphical user interface.

14. The method of claim 13, wherein causing at least the portion of the first data to be included on the graphical user interface comprises:

modifying a color of the component in the graphical user interface.

15. The method of claim 13, wherein causing at least the portion of the first data to be included on the graphical user interface comprises:

modifying a brightness of the component in the graphical user interface.

16. The method of claim 13, wherein causing at least the portion of the first data to be included on the graphical user interface comprises:

modifying a size of the component in the graphical user interface.

17. The method of claim 13, wherein causing at least the portion of the first data to be included on the graphical user interface comprises:
- displaying an icon in proximity to the component in the graphical user interface.

18. The method of claim 13, wherein the deployment status of the first autonomous vehicle further comprises at least one of:
- an indication of a geographical region assigned to the first autonomous vehicle for operation, or
- an indication of a route assigned to the first autonomous vehicle for traversal,
- an indication of one or more prior locations of the first autonomous vehicle.

\* \* \* \* \*